(12) United States Patent
Koo et al.

(10) Patent No.: US 9,367,206 B2
(45) Date of Patent: Jun. 14, 2016

(54) DISPLAYING INDICATORS THAT INDICATE ABILITY TO CHANGE A SIZE OF A WIDGET ON A DISPLAY OF A MOBILE TERMINAL

(71) Applicant: LG ELECTRONICS INC., Seoul (KR)

(72) Inventors: Bon Joon Koo, Seoul (KR); Deukmo Koo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 174 days.

(21) Appl. No.: 13/891,053

(22) Filed: May 9, 2013

(65) Prior Publication Data

US 2013/0311920 A1 Nov. 21, 2013

(30) Foreign Application Priority Data

May 17, 2012 (KR) .......................... 10-2012-0052681
Aug. 31, 2012 (KR) .......................... 10-2012-0096729

(51) Int. Cl.
*G06F 3/048* (2013.01)
*G06F 3/0481* (2013.01)
*H04L 12/58* (2006.01)
*H04N 21/488* (2011.01)
*G06F 3/0488* (2013.01)

(52) U.S. Cl.
CPC ........ *G06F 3/04817* (2013.01); *G06F 3/04883* (2013.01); *H04L 12/587* (2013.01); *H04N 21/488* (2013.01)

(58) Field of Classification Search
CPC ........................... G06F 3/0481; G06F 3/04812
USPC .......................... 715/798, 800, 801, 788, 815
See application file for complete search history.

(56) References Cited

U.S. PATENT DOCUMENTS

| 5,956,032 A * | 9/1999 | Argiolas ........................ 715/798 |
| 8,132,116 B1 * | 3/2012 | Schendel ....................... 715/764 |
| 2003/0107604 A1 * | 6/2003 | Ording ........................... 345/788 |
| 2004/0090470 A1 * | 5/2004 | Kim et al. ...................... 345/846 |
| 2005/0104897 A1 * | 5/2005 | Walker et al. ................. 345/620 |
| 2011/0252373 A1 * | 10/2011 | Chaudhri ...................... 715/835 |

(Continued)

FOREIGN PATENT DOCUMENTS

| CN | 101047913 | 10/2007 |
| CN | 101154140 | 4/2008 |

(Continued)

OTHER PUBLICATIONS

The State Intellectual Property Office of the People's Republic of China Application Serial No. 201310185120.9, Office Action dated Nov. 3, 2014, 9 pages.

*Primary Examiner* — Ajay Bhatia
*Assistant Examiner* — Phuong Nguyen
(74) *Attorney, Agent, or Firm* — Lee Hong Degerman Kang & Waimey; Jonathan Kang; Jeffrey Lotspeich

(57) ABSTRACT

A mobile terminal capable of performing a touch input and a control method therefor are provided. A mobile terminal includes a display unit, a sensing unit and a controller. The display unit outputs an objective related to an application. The sensing unit senses a touch input to the objective. The controller executes the application related to the objective, in response to that a first touch input to the objective is sensed, and executes an edition mode for changing the size of the objective displayed on the display unit, in response to that a second touch input different from the first touch input to the objective is sensed.

12 Claims, 44 Drawing Sheets

(56) References Cited

U.S. PATENT DOCUMENTS

2011/0264442 A1* 10/2011 Huang et al. ............... 704/9
2011/0302519 A1* 12/2011 Fleizach et al. ............ 715/773
2012/0127206 A1* 5/2012 Thompson et al. ......... 345/661
2013/0305187 A1* 11/2013 Phillips et al. ............. 715/800

FOREIGN PATENT DOCUMENTS

| | | |
|---|---|---|
| CN | 101477435 | 7/2009 |
| EP | 2426590 | 3/2012 |
| KR | 10-0782336 | 12/2007 |

* cited by examiner

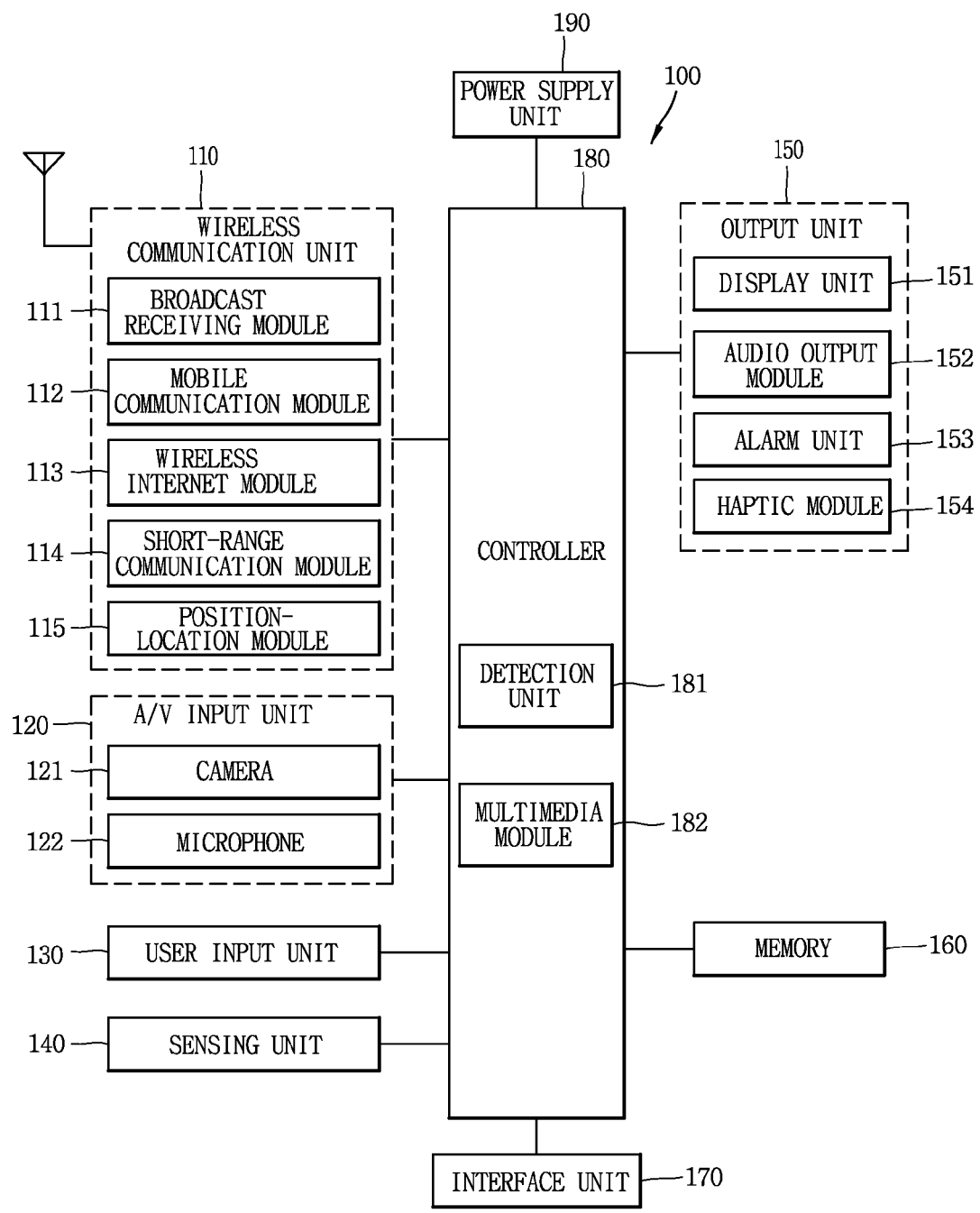

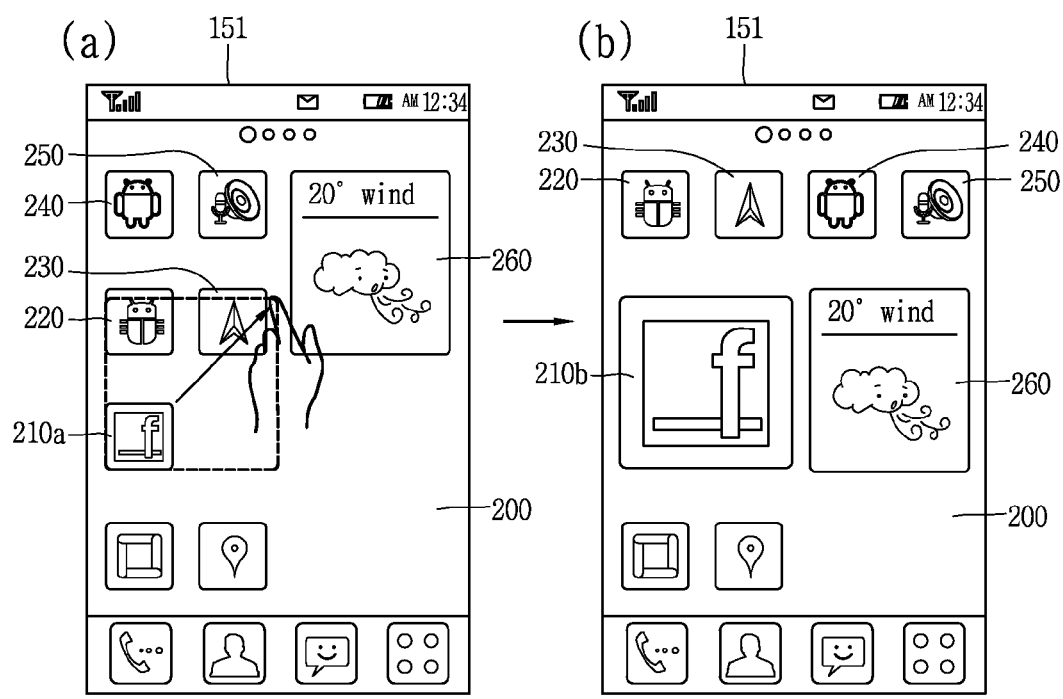

FIG. 9B
(a)
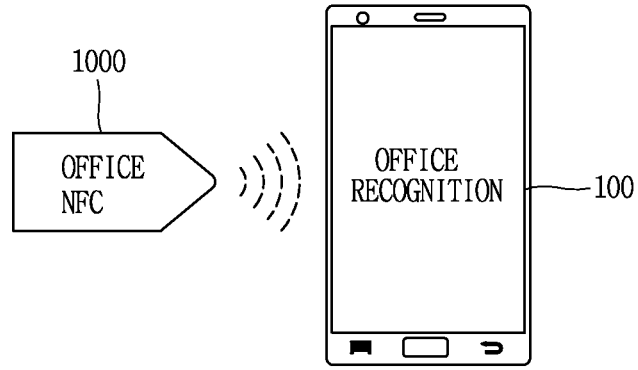
(b)
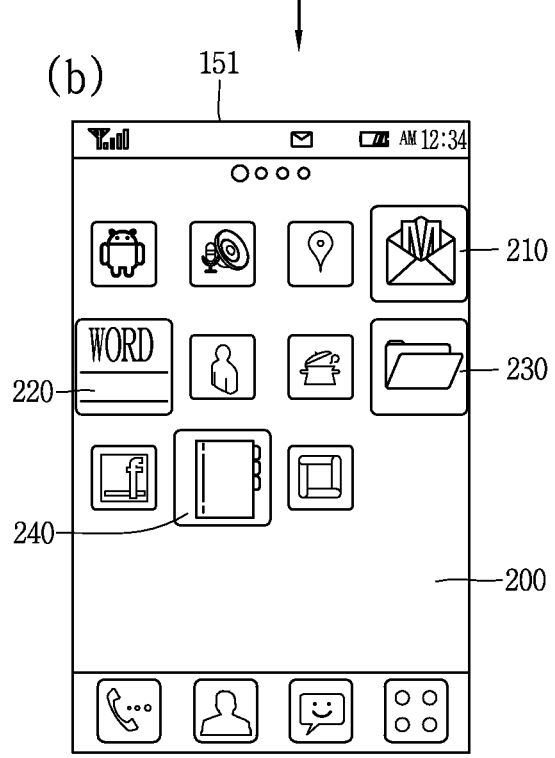

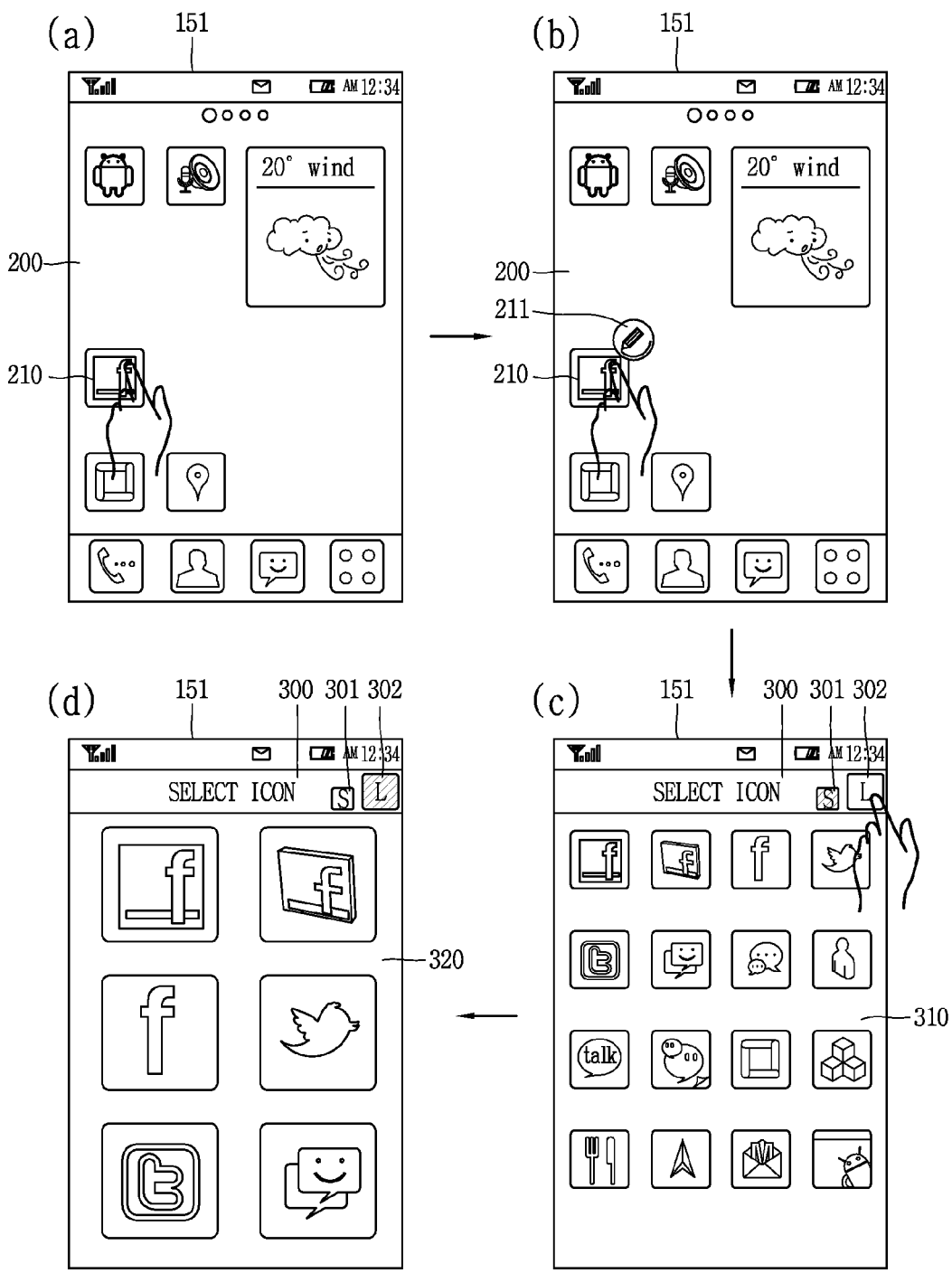

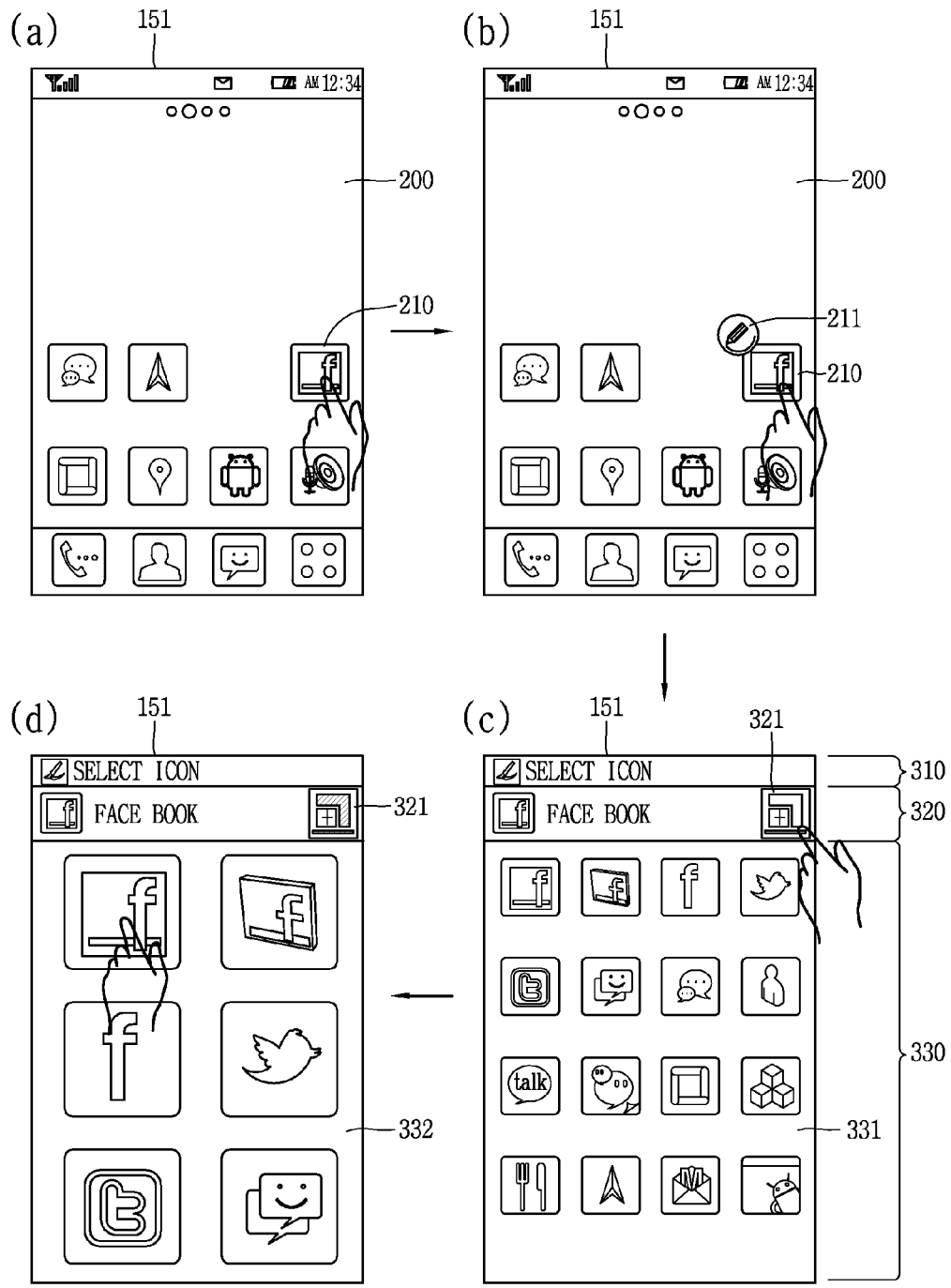

DISPLAYING INDICATORS THAT INDICATE ABILITY TO CHANGE A SIZE OF A WIDGET ON A DISPLAY OF A MOBILE TERMINAL

CROSS-REFERENCE TO RELATED APPLICATIONS

Pursuant to 35 U.S.C. §119(a), this application claims the benefit of earlier filing date and right of priority to Korean Applications No. 10-2012-0052681, filed on May 17, 2012 and No. 10-2012-0096729, filed on Aug. 31, 2012, the contents of which is incorporated by reference herein in its entirety.

BACKGROUND OF THE INVENTION

1. Field of the Invention

The present disclosure relates to a mobile terminal capable of performing a touch input and a control method therefor.

2. Description of the Conventional Art

Terminals can be divided into mobile/portable terminals and stationary terminals according to their mobility. The portable terminals can be divided into handheld terminals and vehicle mount terminals according to whether a user directly carries his or her terminal.

As such a mobile terminal becomes multifunctional, the mobile terminal can be allowed to capture still images or moving images, play music or video files, play games, receive broadcast, etc., so as to be implemented as an integrated multimedia player. In order to support and enhance such functions of the terminal, it can be considered to improve configuration and/or software of the terminal.

Icons representing applications can be output on a display unit of the mobile terminal in order to promote entry convenience of the applications.

SUMMARY OF THE INVENTION

Therefore, an aspect of the detailed description is to provide a mobile terminal and a control method therefor, which can variously change the size of an icon or widget related to an application displayed on a display unit.

To achieve these and other advantages and in accordance with the purpose of this specification, as embodied and broadly described herein, a mobile terminal includes a display unit configured to output an objective related to an application; a sensing unit configured to sense a touch input to the objective; a controller configured to execute the application related to the objective, in response to that a first touch input to the objective is sensed, and execute an edition mode for changing the size of the objective displayed on the display unit, in response to that a second touch input different from the first touch input to the objective is sensed, wherein the controller controls the display unit to output an editing screen for changing the size of the objective, based on that the edition mode is executed, and outputs, on the editing screen, any one of a plurality of pages respectively matched to the different size information and a conversion icon for converting the current page into a page matched to size information different from that corresponding to the one of the plurality of pages.

In one exemplary embodiment, a plurality of image items may be included on the one page. If any one of the plurality of image items included on the one page is selected by a user, the controller may change at least one of the image and size of the objective to correspond to an image corresponding to the selected image item and size information of the one page, and output the objective on the display unit.

In one exemplary embodiment, the controller may control the display unit to output a page matched to the different size information among the plurality of pages, in response to that the conversion icon is selected.

In one exemplary embodiment, if any one of the plurality of image items included on the page matched to the different size information is selected by the user, the controller may change at least one of the image and size of the objective to correspond to an image corresponding to the selected image item and size information of the page matched to the different size information, and output the objective on the display unit.

In one exemplary embodiment, the controller may determine a range in which the size of the objective is changeable, in consideration of the displacement relationship between the objective and the at least one other objective placed near the objective on the display unit. When it is impossible to change the size of the objective to correspond to the size information matched to the different size information on the position at which the objective is placed as the determined result, the controller may not change both the image and size of the objective.

In one exemplary embodiment, if the conversion icon is selected, the controller may change a visual exterior appearance of the conversion icon.

In one exemplary embodiment, the visual exterior appearance may be related to at least one of the color, transparency and size of the conversion icon.

In one exemplary embodiment, the objective related to the application may be included on a home screen, and the one page included on the editing screen output, based on that the edition mode is executed, may be a page matched to the same size information as that of the objective output on the home screen before the edition mode is executed, among the plurality of pages.

To achieve these and other advantages and in accordance with the purpose of this specification, as embodied and broadly described herein, a mobile terminal includes a display unit configured to output an objective related to an application; a sensing unit configured to sense a touch input through which an edition mode for changing attribute information of the objective is executed; and a controller configured to output, on the display unit, an editing screen including any one of a plurality of pages respectively matched to the different size information and a conversion icon for converting the current page into a page matched to size information different from that corresponding to the one of the plurality of pages, based on that the edition mode is executed, control the display unit to output the page matched to the different size information, in response to that the conversion icon is selected, and, if any one of the plurality of image items included on the page matched to the different size information, change at least one of the image and size of the objective to correspond to an image corresponding to the selected image item and size information of the page matched to the different size information, and outputs the objective on the display unit.

In one exemplary embodiment, the objective related to the application may be included on a home screen, and the one page included on the editing screen output, based on that the edition mode is executed, may be a page matched to the same size information as that of the objective output on the home screen before the edition mode is executed, among the plurality of pages.

To achieve these and other advantages and in accordance with the purpose of this specification, as embodied and broadly described herein, a control method for a mobile terminal including a display unit on which it is possible to display an object related to an application, includes sensing a touch input applied to the objective; outputting, on the display unit, an editing screen including any one of a plurality of pages respectively matched to the different size information and a conversion icon for converting the current page into a page matched to size information different from that corresponding to the one of the plurality of pages, based on that the edition mode is executed; and outputting the page matched to the different size information, in response to that the conversion icon is selected, and, if any one of the plurality of image items included on the page matched to the different size information, changing at least one of the image and size of the objective to correspond to an image corresponding to the selected image item and size information of the page matched to the different size information, and outputting the objective on the display unit.

In one exemplary embodiment, the touch input may be a touch input having a method different from that of the touch input for executing the application related to the objective.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram illustrating a mobile terminal according to an exemplary embodiment;

FIGS. 8A to 8F are conceptual views illustrating a method for placing an objective as the size of the objective is changed in the mobile terminal according to an exemplary embodiment;

FIGS. 9A to 9D are conceptual views illustrating a method for changing the size of an objective based on status information in the mobile terminal according to an exemplary embodiment;

FIGS. 11A to 11D are conceptual views illustrating a method for changing at least one of the size and image of an objective in the mobile terminal according to an exemplary embodiment;

FIGS. 12A to 12C are conceptual views illustrating a method for setting the image and size of an objective through a plurality of pages corresponding to different size information in the mobile terminal according to an exemplary embodiment.

DETAILED DESCRIPTION OF EXEMPLARY EMBODIMENTS

Figure 2A:
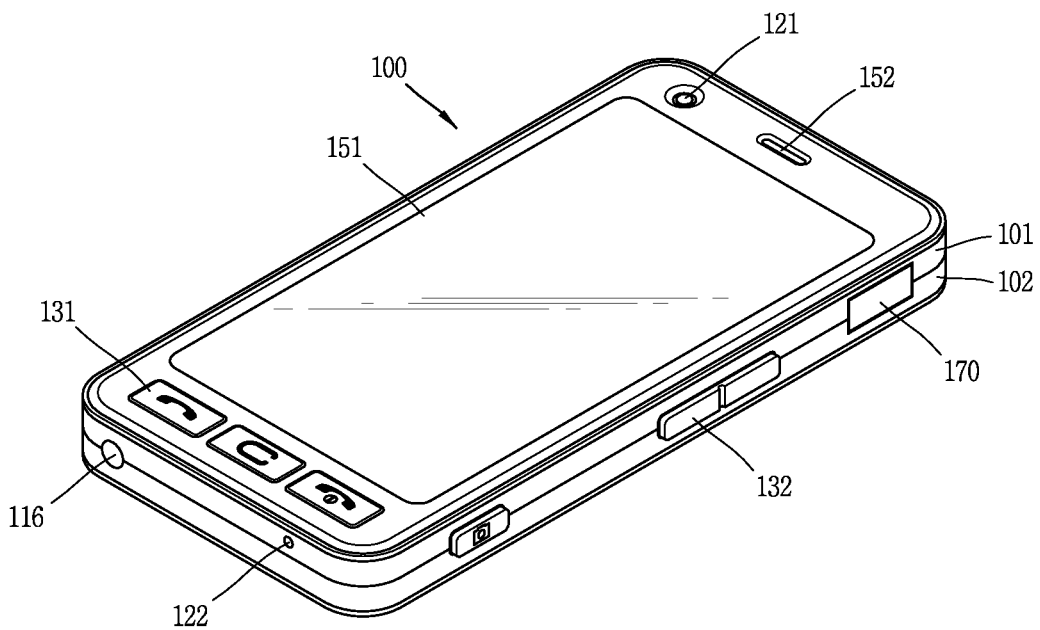
FIGS. 2A and 2B are perspective views illustrating an example of the mobile terminal viewed from the front according to the exemplary embodiment.

Hereinafter, the present disclosure will be explained in more detail with reference to the attached drawings. For the sake of brief description with reference to the drawings, the same or equivalent components will be provided with the same reference numbers, and description thereof will not be repeated. The suffixes "module" and "unit or portion" for components used in the following description merely provided only for facilitation of preparing this specification, and thus they are not granted a specific meaning or function. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC and an ultra book. However, it will be obvious to those skilled in the art that the present invention may be also applicable to a fixed terminal such as a digital TV and a desktop computer, except for specific configurations for mobility.

FIG. 1 is a block diagram of a mobile terminal according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The mobile communication module 112 is configured to implement a video call mode and a voice call mode. The video call mode indicates a call performed while a user views another party, whereas the voice call mode indicates a call performed while a user does not view another party. For implementation of the video call mode and the voice call mode, the mobile communication module 112 is configured to transceive at least one of voice data and image data.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151.

The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or a capturing mode, the display unit 151 may display a captured and/or received image or a GUI or a UI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of these displays may be configured to be transparent so that outside may be seen therethrough, which may be referred to as a transparent display. A representative example of this transparent display may include a transparent organic light emitting diode (TOLED), etc. The mobile terminal 100 may include two or more display units 151. For example, the mobile terminal may include both an external display unit (not shown) and an internal display unit (not shown). The touch screen may be configured to detect a touch input pressure as well as a touch input location and a touch input area.

The display unit 151 may be implemented in two or more in number according to a configured aspect of the mobile terminal 100. For instance, a plurality of displays may be arranged on one surface integrally or separately, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor may be arranged at an inner region of the mobile terminal covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, and the like. In addition to video or audio signals, the alarm unit 153 may output signals in a different manner, for example, to inform about an occurrence of an event. For example, the alarm unit 153 may output a signal in the form of vibration. Such video signal or audio signal may be output through the display unit 151 or the audio output module 152. Accordingly, the display unit 151 or the audio output module 152 may be categorized into part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a map data, phonebook, messages, still images, video, etc.) that are inputted or outputted. The memory 160 may store therein data on vibrations and sounds of various patterns output when a touch is input onto the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

Here, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

Once a preset condition of the mobile terminal is satisfied, the controlled 180 can execute a locked state for limiting a user's input of control commands with respect to applications. And, the controller 180 can control a locked screen displayed in the locked state, based on a touch input sensed by the display unit (hereinafter, will be referred to as 'touch screen' 151) in the locked state.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2B:
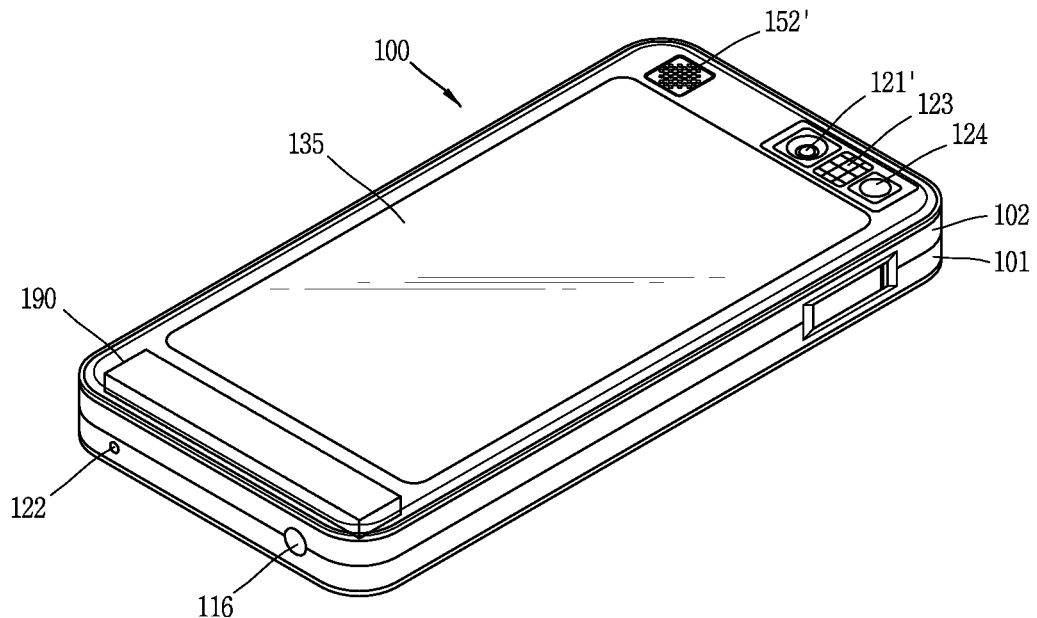

FIG. 2A is a front perspective view of the mobile terminal according to an embodiment of the present invention, and FIG. 2B is a rear perspective view of the mobile terminal according to an embodiment of the present invention The mobile terminal 100 according to the present disclosure is a bar type mobile terminal. However, the present disclosure is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction.

A case (casing, housing, cover, etc.) forming an outer appearance of the body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, user input units 130/131 and 132, a microphone 122, an interface unit 170, etc.

The display unit 151 occupies most parts of a main surface of the front case 101. The audio output unit 152 and the camera 121 are arranged at a region adjacent to one end of the stereoscopic display unit 151, and the user input unit 131 and the microphone 122 are arranged at a region adjacent to another end of the display unit 152. The user input unit 131, the interface unit 170, etc. may be arranged on side surfaces of the front case 101 and the rear case 102. On the other hand, the microphone 122 is arranged at another end of the body.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands inputted through the first or second user input units 131 and 132 may be variously set. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151, the touch pad 135 may be formed to be light-transmissive. In this case, if the display unit 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed close to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display unit 151 of the front case 101. The touch pad 135 may be disposed on the rear surface of the display unit 151 in parallel. The touch pad 135 may have a size equal to or smaller than that of the display unit 151.

The controller 180 in the mobile terminal according to the exemplary embodiment, which can include at least one component described above, may output, on the display unit 151, at least one objective respectively corresponding to at least one application. The controller 180 may execute an edition mode for changing attribute information of the objective, particularly the size (or display size) of the objective displayed on the display unit 151, based on a touch input to the objective.

Figure 3:
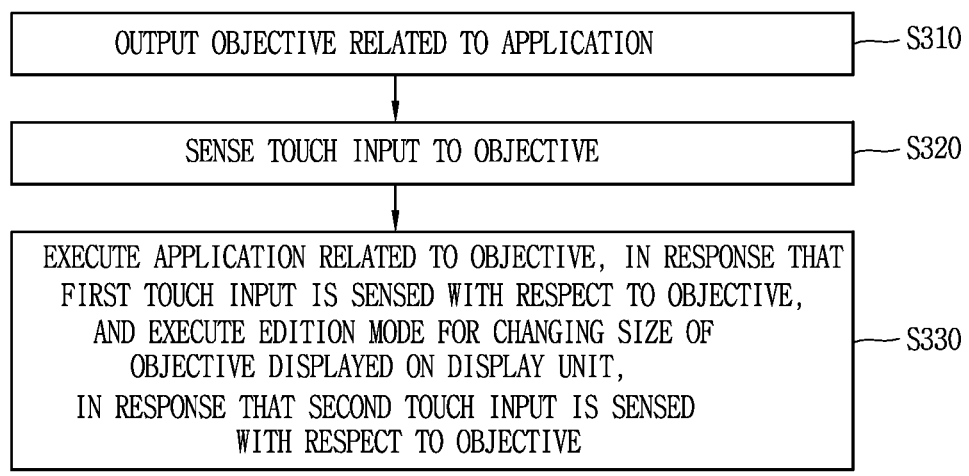
FIG. 3 is a flowchart illustrating a control method for executing an edition mode in the mobile terminal according to an exemplary embodiment.
Figure 4:
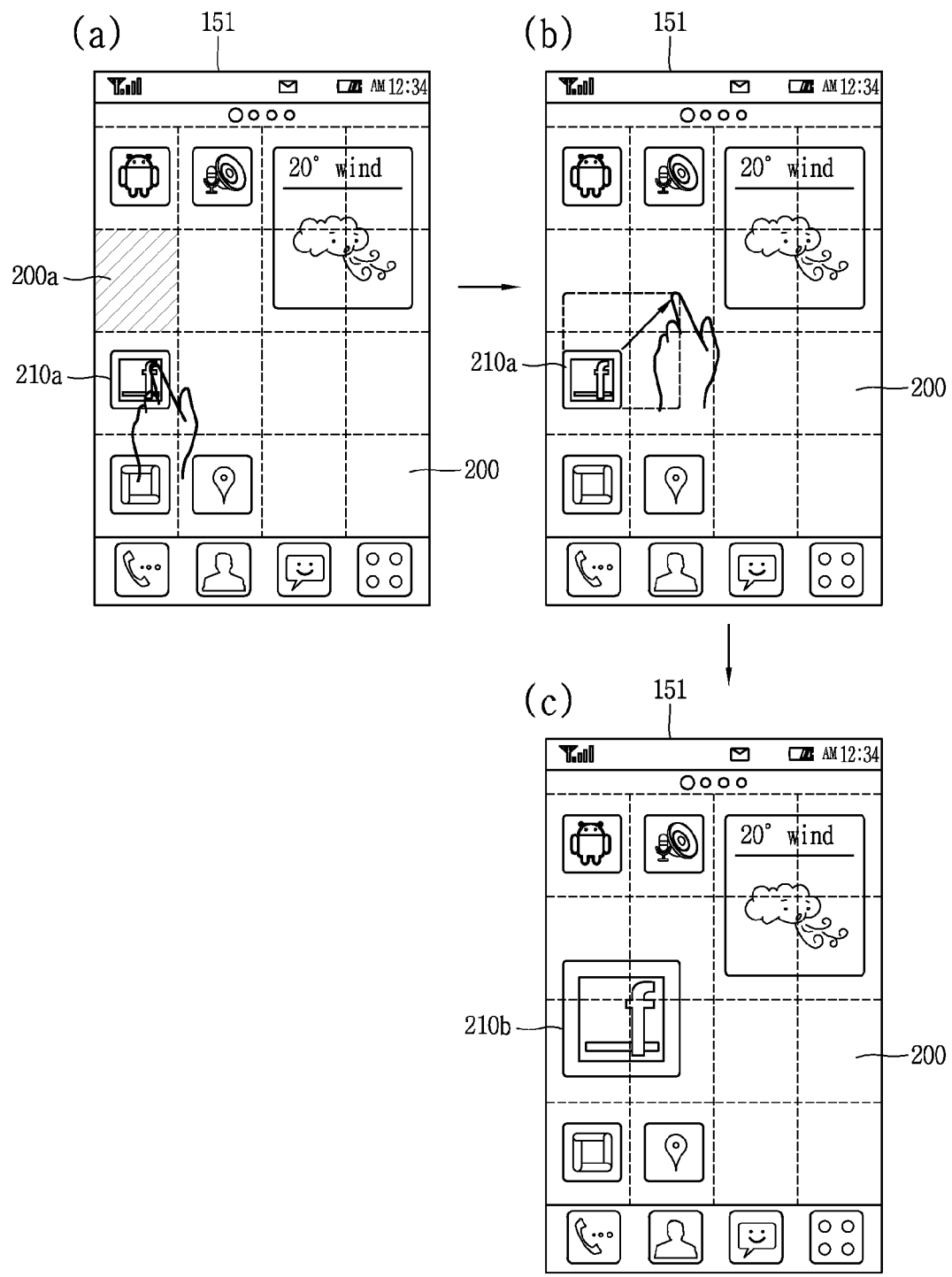
FIG. 4 is a conceptual view illustrating the control method in the mobile terminal according to the exemplary embodiment.

Hereinafter, a method for changing the size of an objective displayed on a display unit through an edition mode will be described in detail with respect to the accompanying drawings. FIG. 3 is a flowchart illustrating a control method for executing an edition mode in the mobile terminal according to an exemplary embodiment. FIG. 4 is a conceptual view illustrating the control method in the mobile terminal according to the exemplary embodiment.

Referring to FIG. 3, in the mobile terminal according to the exemplary embodiment, the controller 180 outputs an objective related to an application on the display unit 151 (S310).

Here, the objective may be an icon related to the application installed in the mobile terminal, a widget or a folder having at least one icon grouped therein. The objective may be included in a home screen (or idle screen, home screen page) or menu screen to be output on the display unit 151. Hereinafter, the objective output on the home screen will be described as an example.

In a case where a touch input is applied to any one of at least one objective in the state in which the at least one objective is output on the display unit 151 as shown in step S310 and FIG. 4 (a), the sensing unit 140 senses the touch input applied to the objective (S320). That is, if a touch input is applied to an objective 210a related to a 'Facebook' application as shown in FIG. 4 (a), the sensing unit 140 may sense the touch input.

The controller 180 executes the application related to the objective 210a, in response that a first touch input is sensed with respect to the objective 210a, and executes an edition mode for changing the size of the objective 210a displayed on the display unit 151, in response that a second touch input different to the first touch input is sensed with respect to the objective 210a (S330, see FIG. 3).

That is, the controller 180 may execute the application related to the objective 210a or may execute the edition mode for changing attribute information of the objective 210a according to the kind of the touch input applied to the objective 210.

As such, that different controls are performed according to the kind of the touch input is provided for the purpose that the user selects the objective output on any one of the idle screen, the home screen and the menu screen, thereby executing a function expected by the user. That is, the user's touch input for selecting the objective output on any one of the idle screen, the home screen and the menu screen generally results from the intention to execute the application related to the objective. Thus, in order to distinguish the intention from a user's intention to change the size of the objective, the controller 180 analyzes the maintenance time and pattern of a touch input applied to the objective, and generates different control commands for the objective, based on the analyzed result.

Here, the first touch input may be a single touch (or tab touch) input having a maintenance time less than a reference time, and the second touch input may be a long touch or long press touch input having a maintenance time more than the reference time. The second touch input may further include a drag, pinch-in or pinch-out touch input for moving the objective 210a in an arbitrary direction or changing the objective 210.

The controller 180 may receive at least one of the first and second touch inputs through a user's gesture (or behavior) with respect to the display unit 151, using the proximity sensor 141 included in the sensing unit 140. That is, the controller 180 may receive at least one of the first and second touch inputs through a proximity touch (or non-contact touch) with respect to the display unit 151. The drag, pinch-in or pinch-out touch input described above may also input through the proximity touch (or non-contact touch) with respect to the display unit 151.

As such, the first and second touch inputs may be different touch inputs using a predetermined method. In addition to the touch method described above, the first and second touch inputs may be defined, using various touch methods.

Meanwhile, in a case where the edition mode is executed as the second touch input is applied to the objective 210a, the user may change the size of the objective 210a displayed on the display unit 151.

For example, in a case where the edition mode is being executed, the controller 180 may change the size of an objective to be edited, based on a touch input applied to the objective to be edited (here, the objective to be edited is the objective 210a to which the second touch input is applied as shown in FIG. 4 (a)). In a case where a drag touch input is applied to the objective 210a to be edited as shown in FIG. 4 (b), the controller 180, as shown in FIG. 4 (c), may change the size of the objective 210a to be edited, depending on a degree of the drag input applied to the objective 210a to be edited.

That is, in a case where a drag touch input is applied to the objective 210a to be edited (see FIG. 4 (b)), the controller 180 may decide whether the length where the objective 210a is dragged by the drag touch input is out of a predetermined critical range. In a case where the dragged length is out of the predetermined critical range as the decided result, the controller 180 controls the display unit 151 to display the objective 210a to have a size corresponding to the critical range. In this case, when the dragged length is less than the critical range, the size of the objective 210a to be edited may not be changed.

The critical range may be provided in plural numbers, and the controller 180 may change the size of the objective 210 into different sizes according to which one of the plurality of critical ranges the dragged length of the objective 210 to be edited corresponds to.

As such, the controller 180, as shown in FIG. 4 (c), may change the size of the objective to be edited, based on the drag touch input applied to the objective, and may control the display unit 151 to display an objective 210b to have the changed size.

As described above, in the mobile terminal according to the exemplary embodiment, the user can change the size of an objective displayed on a home screen or menu screen into a user's desired size. Thus, in the mobile terminal according to the exemplary embodiment, the icon of a frequently used application can be displayed to be more attractive than other icons, and thus the user can reduce the entry time into a desired application.

Meanwhile, in the mobile terminal according to the exemplary embodiment, the size of an objective may be changed using various methods, as well as the method for changing the size of the objective through the drag touch input.

Hereinafter, various embodiments in which the size of an objective is selected through an edition mode will be described in detail with reference to the accompanying drawings. FIGS. 5A to 5H are conceptual views illustrating a method for selecting a size of an objective in the mobile terminal according to an exemplary embodiment.

Although the embodiments described below are based on touch inputs (including a direct touch input and a proximity touch input) applied to the display unit, this is merely one exemplary embodiment, and a control command for selecting the size of an objective in the edition mode may be generated, based on a voice command output from a user. That is, the controller 180 may change the size of the objective or may select any one of a plurality of items by recognizing the voice command output from the user.

Figure 5A:
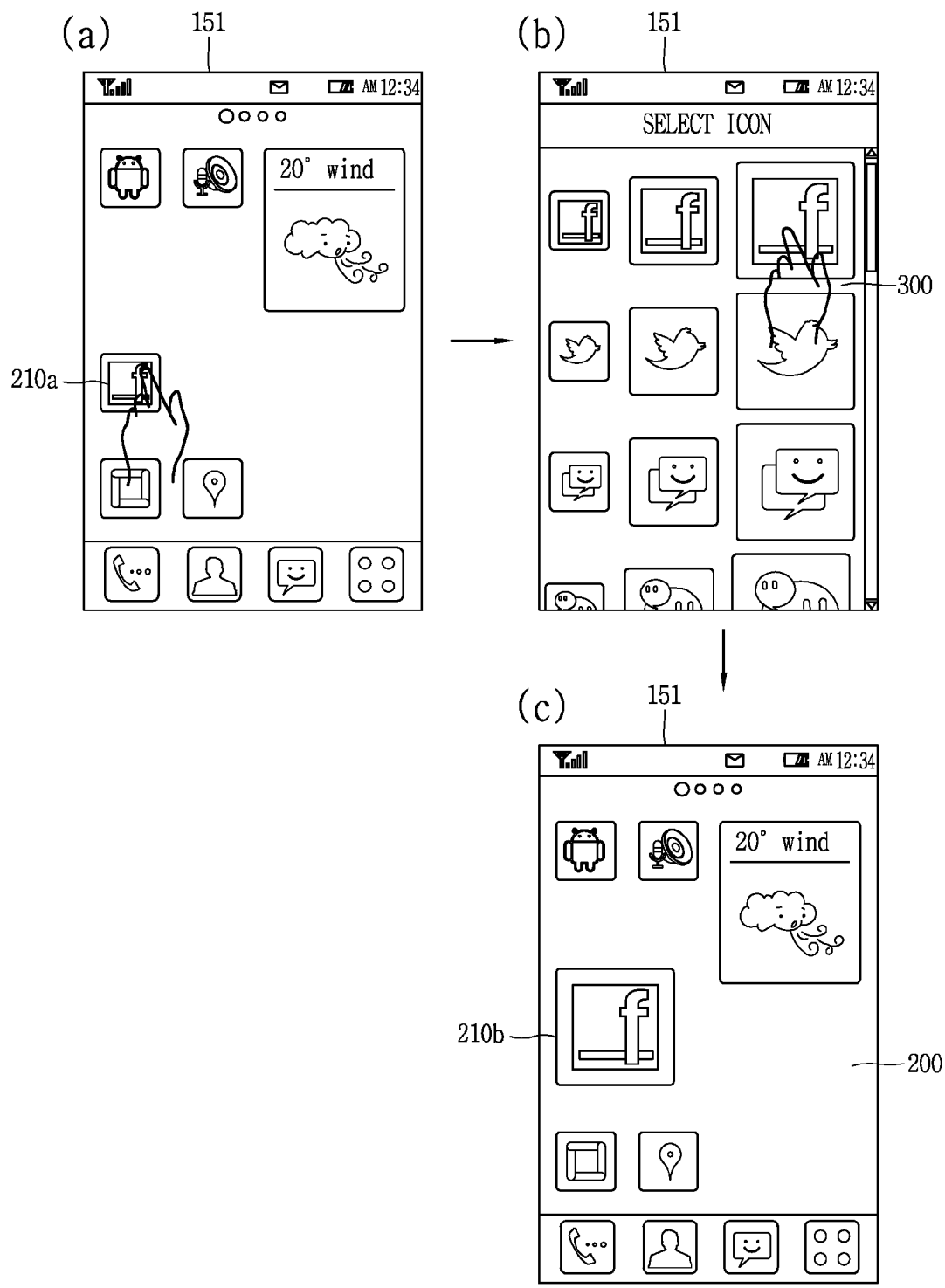
FIGS. 5A to 5H are conceptual views illustrating a method for selecting a size of an objective in the mobile terminal according to an exemplary embodiment.

As an example, as shown in FIG. 5A, the controller 180 (see FIG. 1) controls the display unit 151 to output an editing screen 300 as shown in FIG. 5A (b), based on that a second touch input for executing the edition mode is applied to any one objective 210a (see FIG. 5A (a)) included on the home screen.

A plurality of images different from one another may be included on the editing screen 300, and the plurality of images are matched to items corresponding to different sizes, respectively. Thus, the user can change the image of the objective while changing the display size of the objective through the editing screen 300.

If any one of the plurality of items included on the editing screen 300 is selected (see FIG. 5A (b)), the controller 180, as shown in FIG. 5A (c), may control the display unit 151 to the objective 210 to be edited (see FIG. 5A (a)) to have a size and image corresponding to information on the size and image of the selected item on the home screen 200. Thus, an objective 210b having visual information corresponding to the item selected by the user on the editing screen 300 (see FIG. 5A (b)) is output on the home screen 200.

Figure 5B:
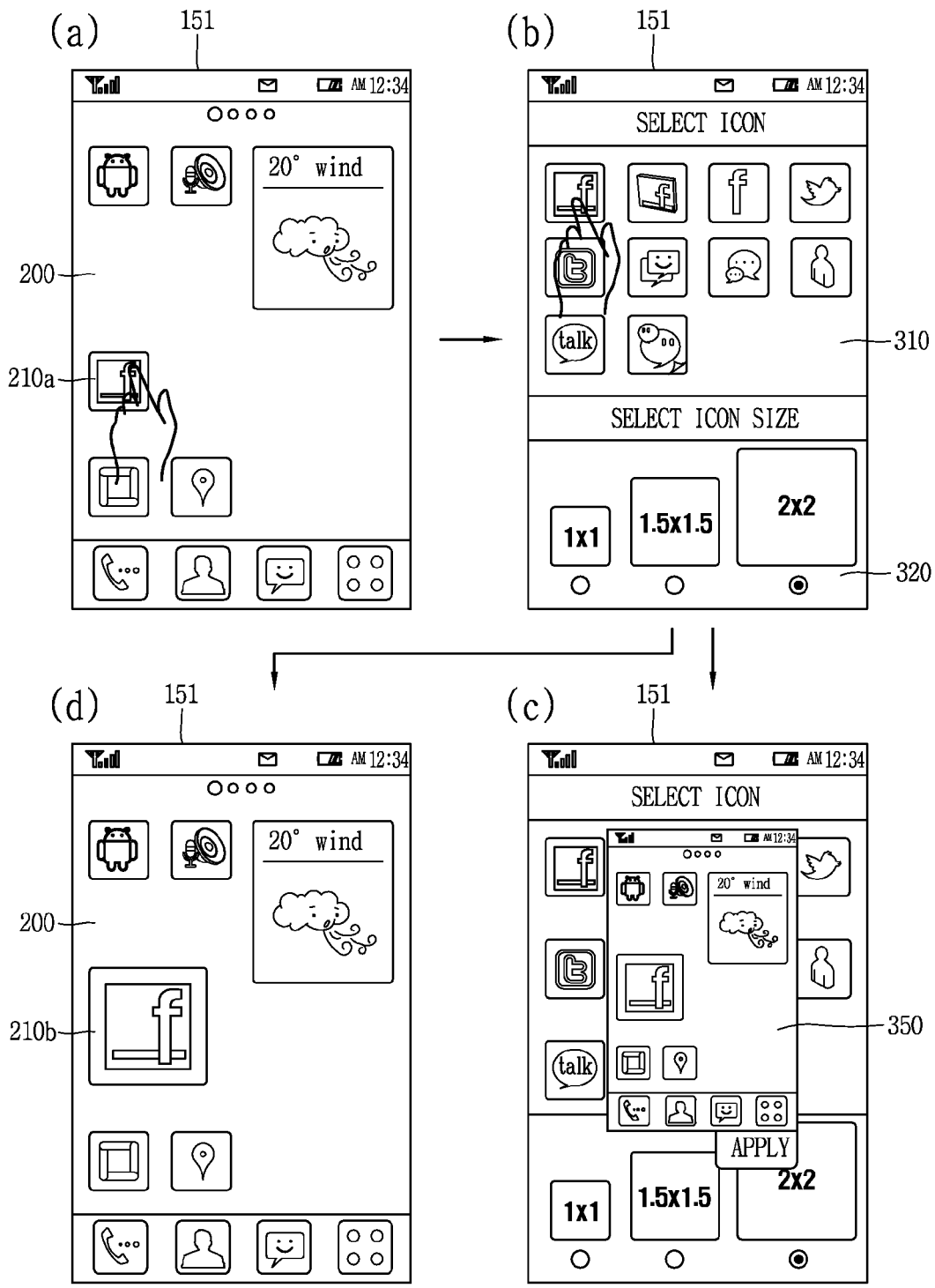

Meanwhile, the editing screen may be divided into a plurality of regions as shown in FIG. 5B (b) and 5C (b). The editing screen may be divided into a first region 310 for selecting an image of the objective and a second region 320 for selecting a size of the objective.

Figure 5C:
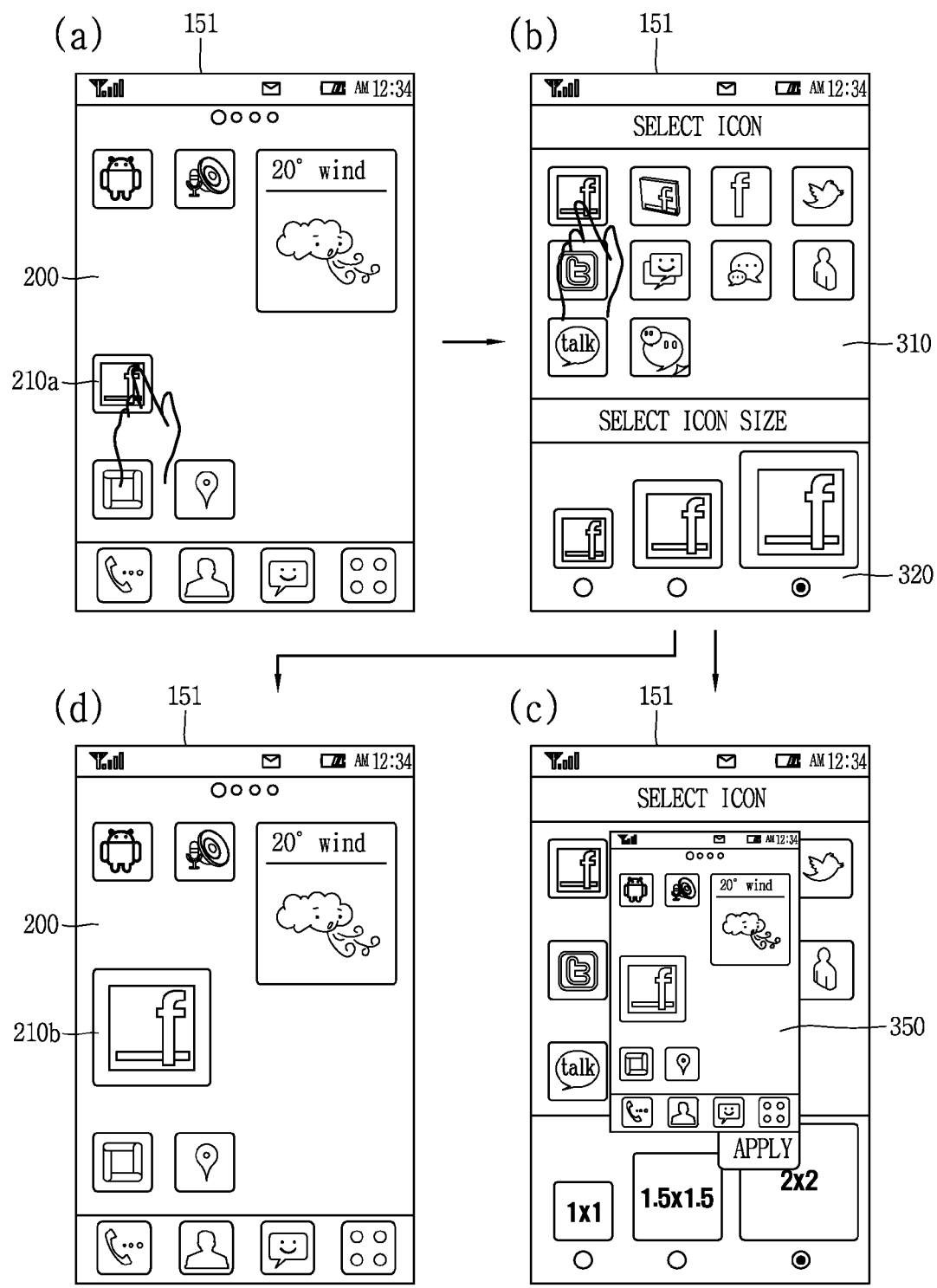

As shown in FIGS. 5B (b) and (d) (or FIGS. 5c (b) and (d)), the controller 180 may combine items respectively selected in the first and second regions 310 and 320, and apply the combined item to the objective to be edited (210a→210b).

If at least one item is selected from the first and second regions 310 and 320, the controller 180, as shown in FIG. 5B (c) (or FIG. 5C (c)), may control the display unit 151 to display a preview screen 350 so that the user can previously see an objective to be changed into an image and size corresponding to the selected item.

The preview screen 350 may be displayed in the embodiment of FIG. 5A described above. For example, if any one of the plurality of items shown in FIG. 5A (b) is selected, the preview screen may be output so that the user can previously see an objective to be changed into a size corresponding to the selected item.

Figure 5D:
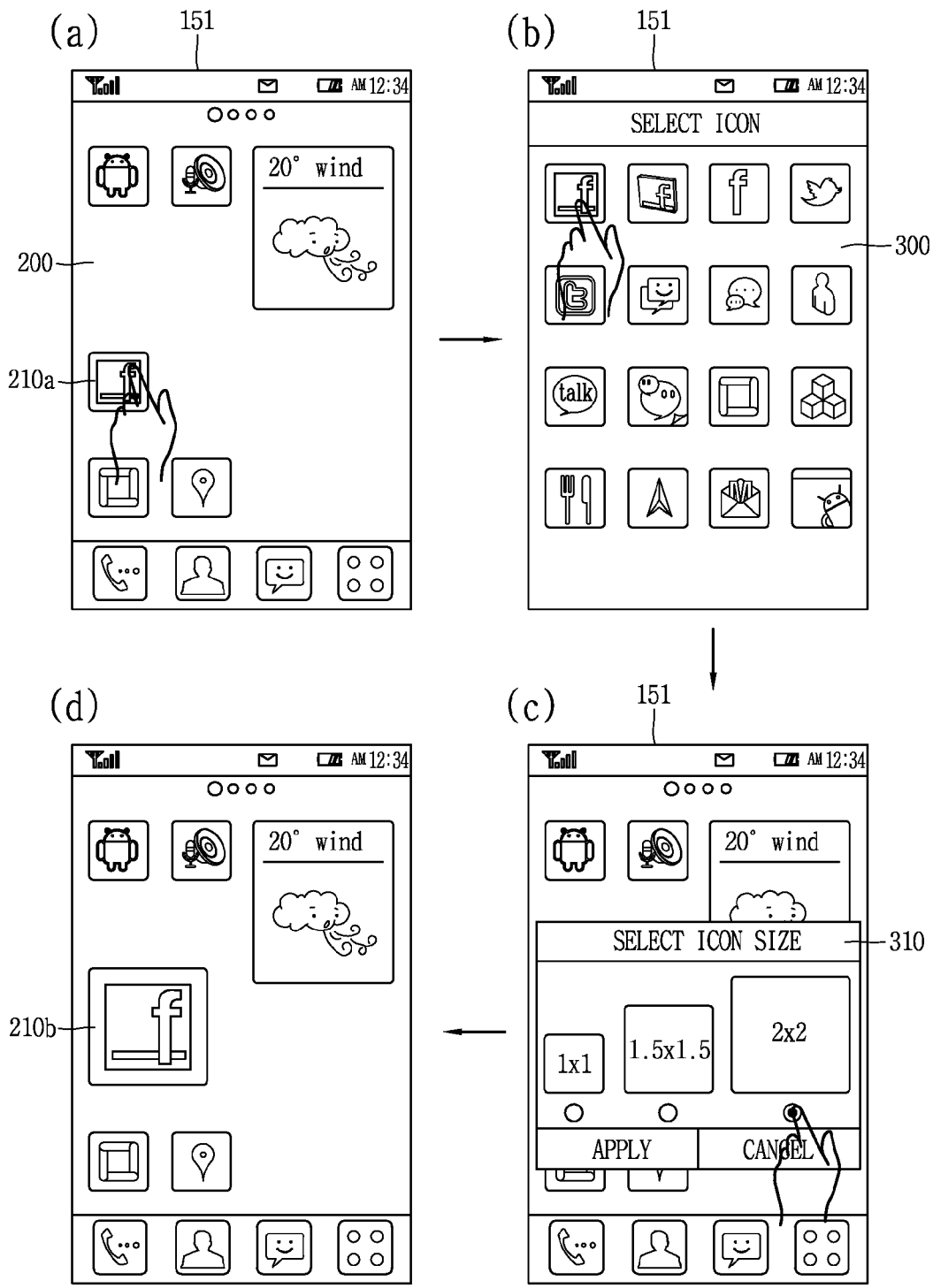

As another example, the editing screen 300 may be configured so that a plurality of image items which can be displayed as images of objectives are output as shown in FIG. 5D (b). If any one of the plurality of image items is selected, the controller 180, as shown in FIG. 5D (c) (or FIG. 5E (c)), may output a popup window 310 and receive a size of the objective selected through the popup window 310.

Although not shown in this figure, the editing screen may be changed into a screen 'Select objective size' for selecting the size of the objective, based on that any one of the plurality of image items is selected. That is, the controller 180 is not output the popup window 310 on the display unit 151 but may entirely output the editing screen for selecting the size of the objective on the display unit 151.

Figure 5E:
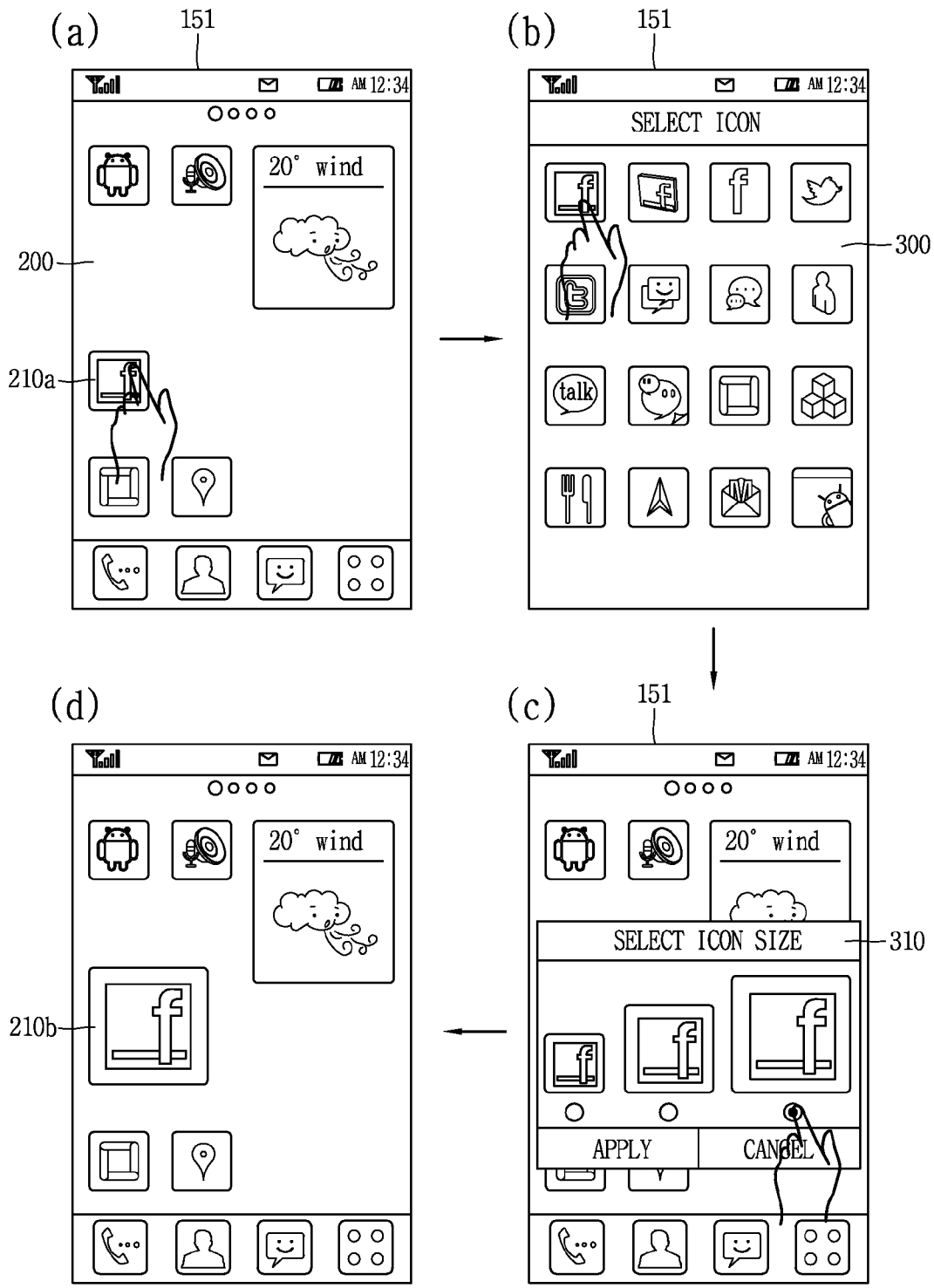

If the size of the objective is selected through the popup window 310, the controller 180, as shown in FIG. 5D (d) (or FIG. 5E (d)), controls the display unit 151 to display the objective 210b to having the changed size.

Meanwhile, in the mobile terminal according to the exemplary embodiment, the size of the objective may be selected on the home screen (or menu screen), as well as that the size of the objective is selected through the editing screen.

Figure 5F:
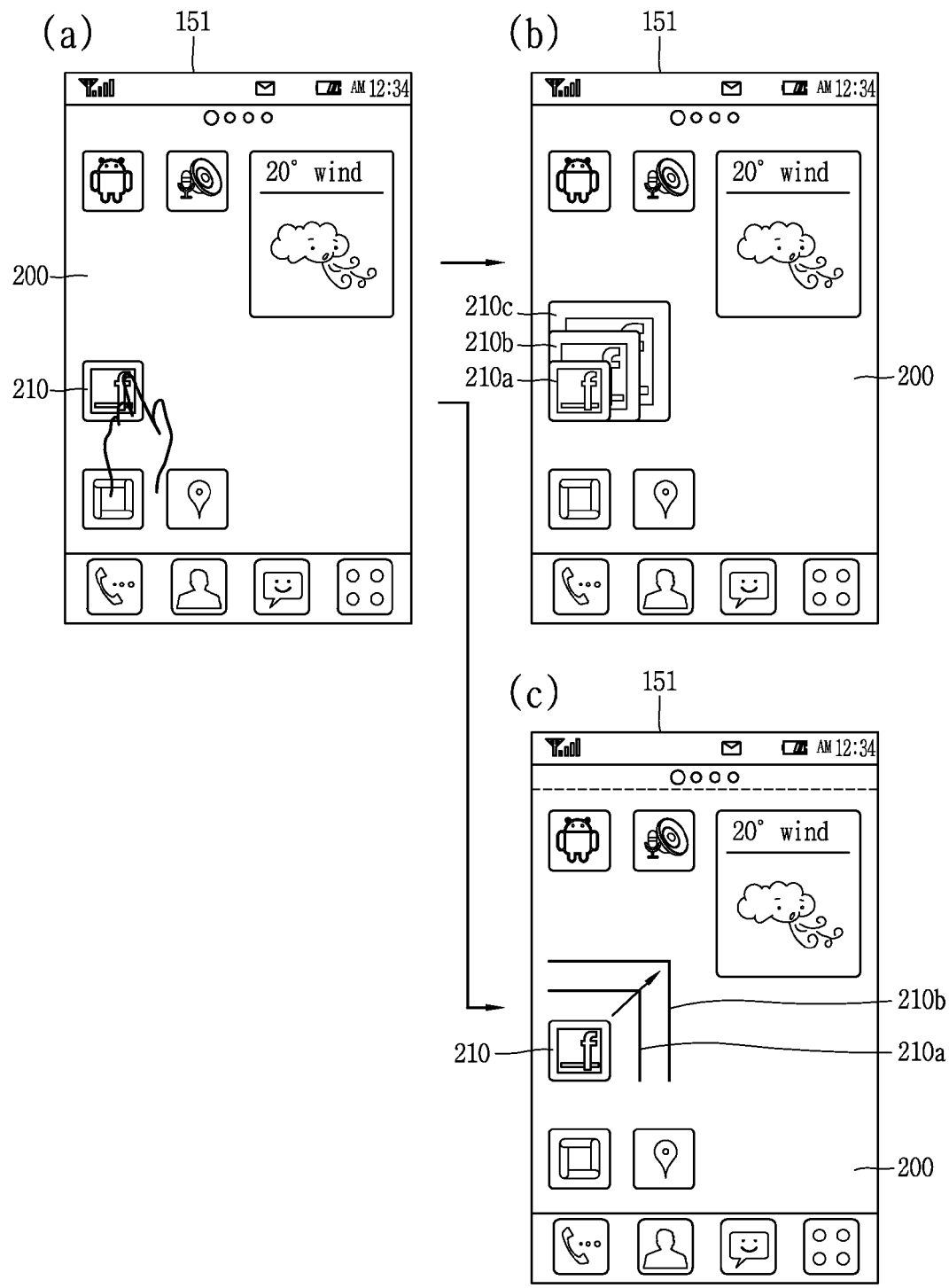

As an example, if a second touch input previously set to execute the edition mode is applied to any one objective 210 included on the home screen 200 as shown in FIG. 5F (a), the controller 180, as shown in FIG. 5F (b), outputs at least guide image 210a, 210b and 210c corresponding to changeable sizes.

If any one of the output guide images 210a, 210b and 210c is selected by the user, the controller 180 changes the size of the objective to have a size corresponding to the selected guide image.

In a case where information on the size of the objective is input through a drag input to the objective 210 as described in FIG. 4, the controller 180 may output, on the display unit 151, guide information 210a and 210b on the length where the drag input is to be minimally input so as to change the size of the objective. That is, the controller 180 provides the user with a critical range of the dragged length, so that the user can recognize the length where the drag input is to be input so as to change the size of the objective.

Figure 5G:
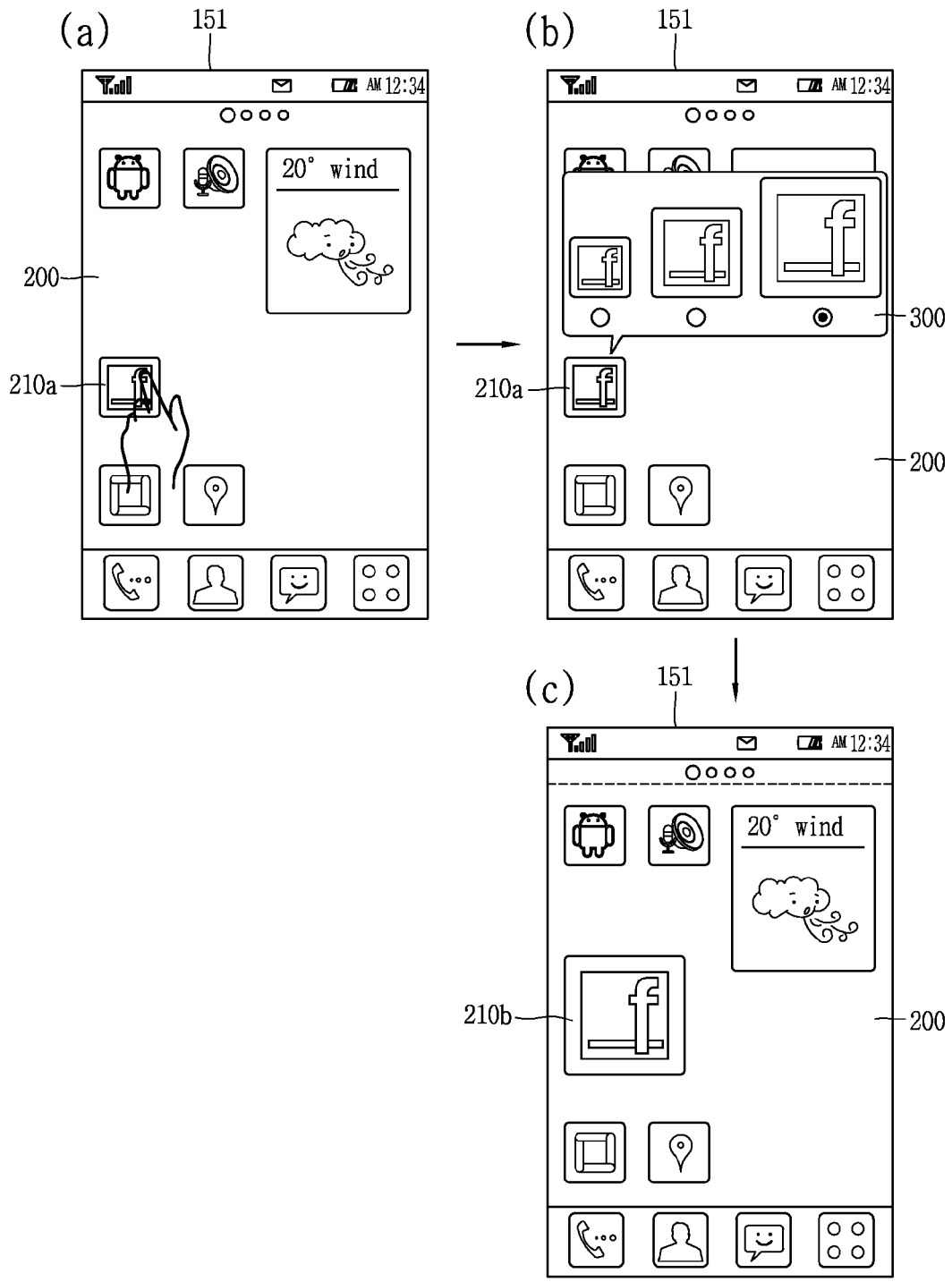

As another example, if a touch input for executing the edition mode is applied to any one objective 210a included on the home screen 200 as shown in FIG. 5G (a), the controller 180, as shown in FIG. 5G (b), may control the display unit 151 to output a popup window 300 including items having different sizes. If any one item is selected through the popup window, the controller 180, as shown in FIG. 5G (c), change the size of an objective 210b into a size corresponding to the selected item.

If a touch input for executing the edition mode is applied to any one objective 210a included on the home screen 200, the controller 180 may output information on a touch input to be applied so as to change the size of the objective 210a through the popup window 300.

Figure 5H:
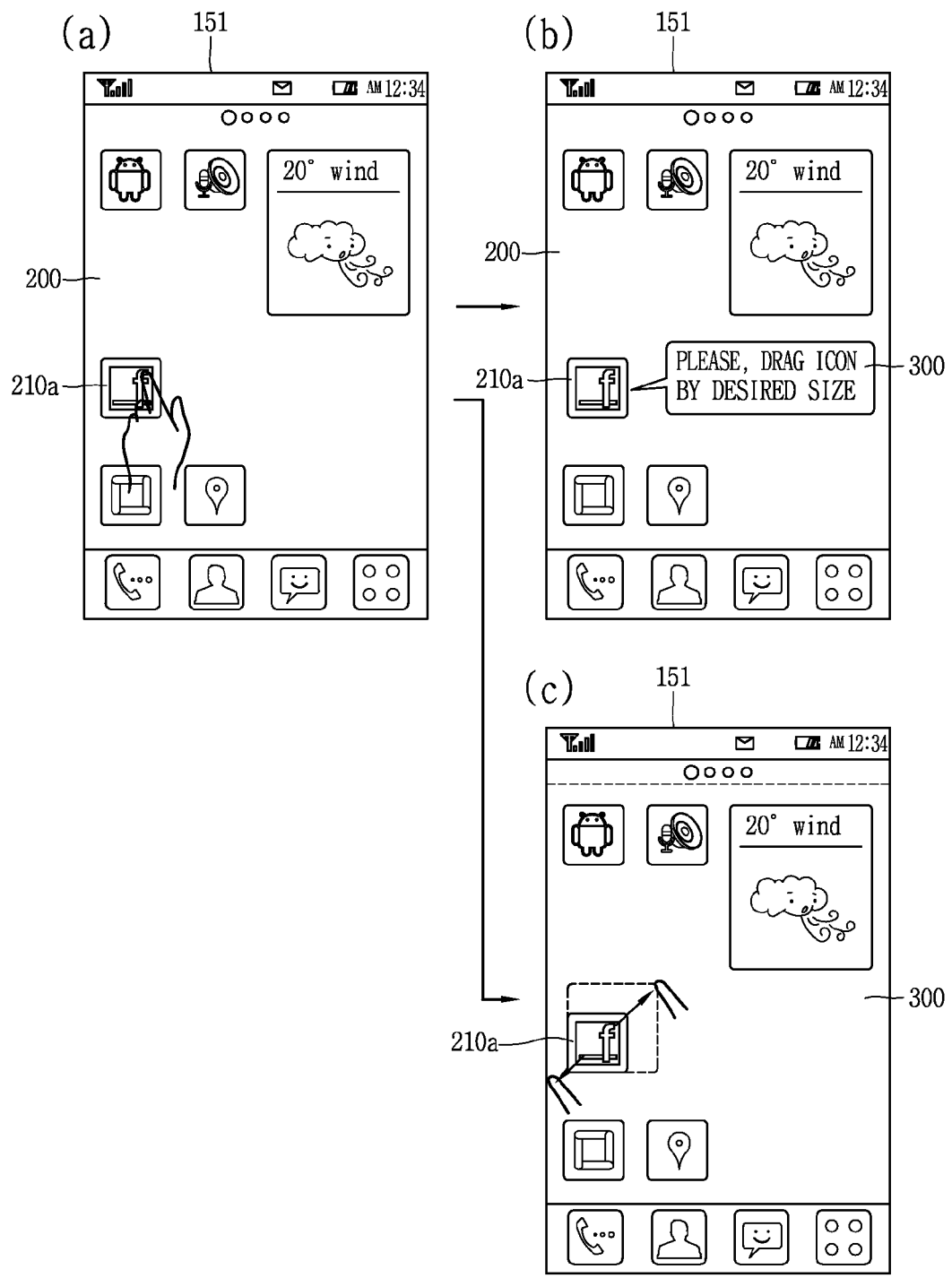

In the aforementioned exemplary embodiment, the method for changing the size of the objective through the drag input has been described. However, in the mobile terminal according to the exemplary embodiment, the size of the objective may be enlarged or reduced through a touch input such as a pinch-in or pinch-out touch input as shown in FIG. 5H (c).

As described above, in the mobile terminal according to the exemplary embodiment, the size of the objective can be selected using the various methods including the method for outputting the editing screen, the method for setting the size of the objective through the drag input, the method for selecting the size of the objective through the size selection screen for selecting the size of the objective, etc. Further, the present disclosure is not limited to the aforementioned exemplary embodiments, and the size of the objective may be selected using various methods.

Figure 6:
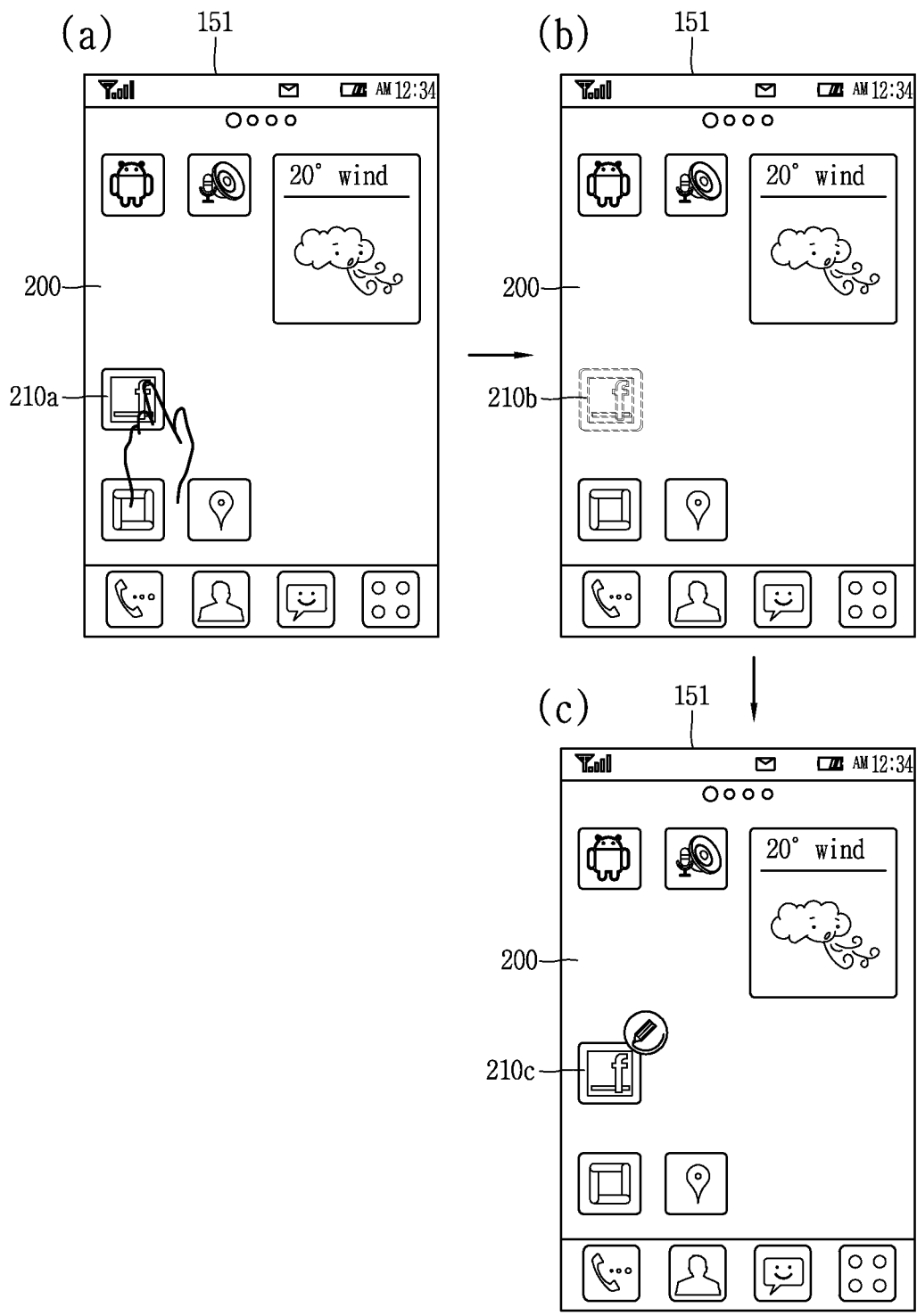
FIG. 6 is a conceptual view illustrating a method for outputting notification information for notifying that an edition mode has been executed in the mobile terminal according to an exemplary embodiment.

Meanwhile, in the mobile terminal according to the exemplary embodiment, in a case where a touch input for executing the edition mode is applied to any one objective 210a as shown in FIG. 6 (a), the controller 180 may output notification information so as to notify the user that the edition mode for the objective 210a has been executed.

As shown in FIG. 6 (b), the notification information may be output through visual information configured to transparently display, enlarge or move an objective 210b to be edited. Although not shown in this figure, the notification information may be output using voice or vibration.

The notification information may be output through a notification image as shown in FIG. 6 (b). The notification image may be overlapped with at least one portion of an objective 210c to be edited. Although not shown in this figure, the notification image may be output in the vicinity of the objective 210c to be edited.

As shown in FIGS. 6 (b) and (c), the controller 180 may receive the size of the objective, selected by the user, using any one of the methods described in FIGS. 5A, 5B, 5C, 5D, 5G and 5H, based on a touch input applied to the objective 210b or 210c after the notification information for notifying the user that the edition mode for changing the size of the objective has been executed is output.

Hereinafter, a method for displaying an objective as an image corresponding to the size obtained by changing the size of the objective will be described in detail with reference to the accompanying drawings. FIGS. 7A to 7E are conceptual views illustrating a method for setting an image of an objective in the mobile terminal according to an exemplary embodiment.

Figure 7A:
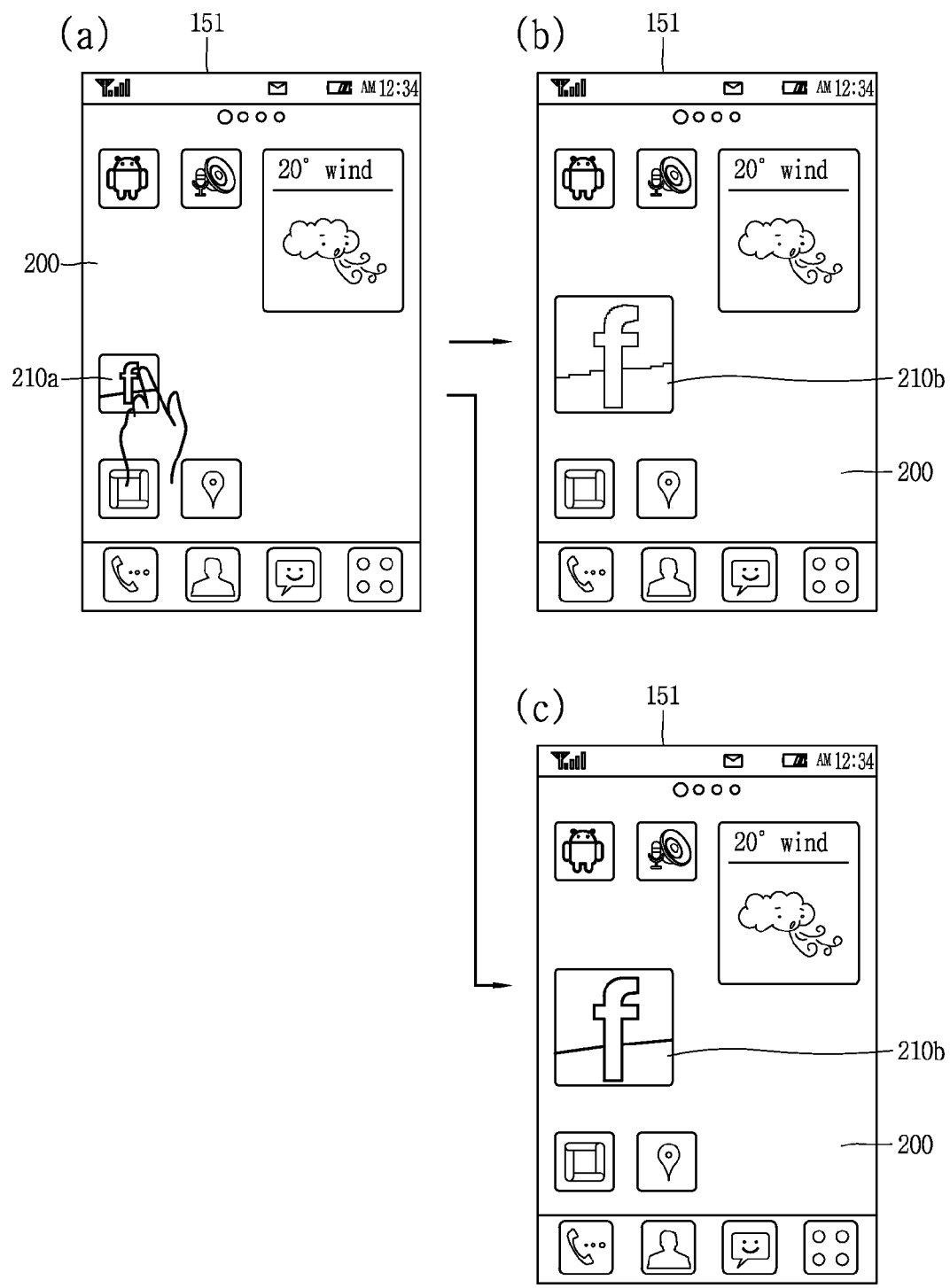
FIGS. 7A to 7E are conceptual views illustrating a method for setting an image of an objective in the mobile terminal according to an exemplary embodiment.

In the mobile terminal according to the exemplary embodiment, when the size of a specific objective 210a is changed, based on a user's selection, as shown in FIG. 7A (a), i.e., particularly when the size of the specific objective 210a is enlarged, the controller 180 may change the image of the objective 210a so as to maintain the resolution of the objective 210a.

That is, in a case where the specific objective 210a is enlarged as shown in FIG. 7A (b), if the same image as the that of the objective 210a before the enlargement is used as the image of the enlarged objective 210b, the objective 210b may be displayed dark as shown in this figure, or pixels may be broken. Therefore, the controller 180, as shown in FIG. 7A (c), may load an image having a resolution corresponding to the size of the enlarged objective 210b from the memory 160 (see FIG. 1), and use the loaded image so as to display the objective 210b.

In this case, a plurality of images having different resolutions are stored in the memory 160. The controller 180 may extract an image having the resolution corresponding to the size of the changed objective from the memory 160, and use the extracted image as the image of the objective.

The controller 180 may newly generate an image corresponding to the size of the enlarged objective 210b so that the enlarged objective 210b can be output with the maximum resolution. That is, the controller 180 may generate an image having improved resolution while maintaining the visual image of the enlarged objective 210b as it is, and use the generated image as the image of the enlarged objective 210b.

In addition to the method for displaying an objective by automatically searching for an image corresponding to the changed size of the objective as shown in FIG. 7A, the controller 180 may provide a function of receiving an image selected by the user so as to reset the range in which the image is displayed on the display unit.

Figure 7B:
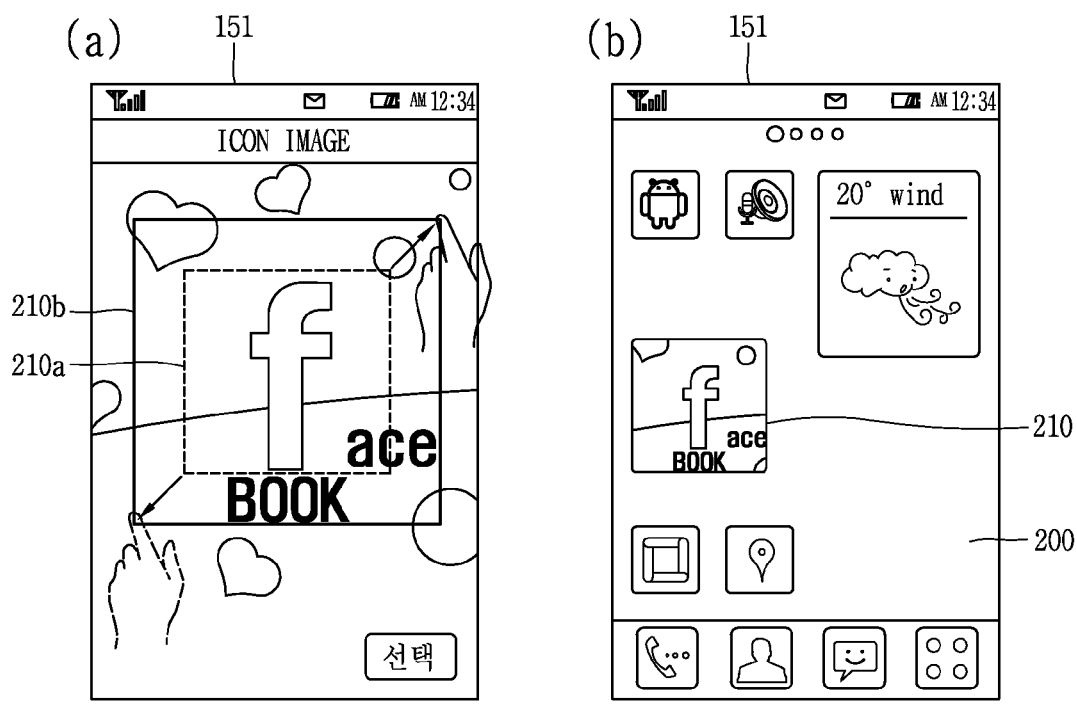

As an example, the controller 180, as shown in FIG. 7B (a), may output the original image of an objective to be changed on the display unit 151, corresponding to a control command for changing the size of the objective. Then, the user may set a range in which the original image is displayed on the display unit 151, using a drag, pinch-in or pinch-out touch input to the original image output on the display unit 151. If the setting of the image to be displayed on the display unit 151 is completed, the controller 180, as shown in FIG. 7B (b), may display an objective 210 using the set image.

As another example, in addition to the image previously stored in the memory 160, the controller 180 may photograph a new image and display an objective using the photographed image.

Figure 7C:
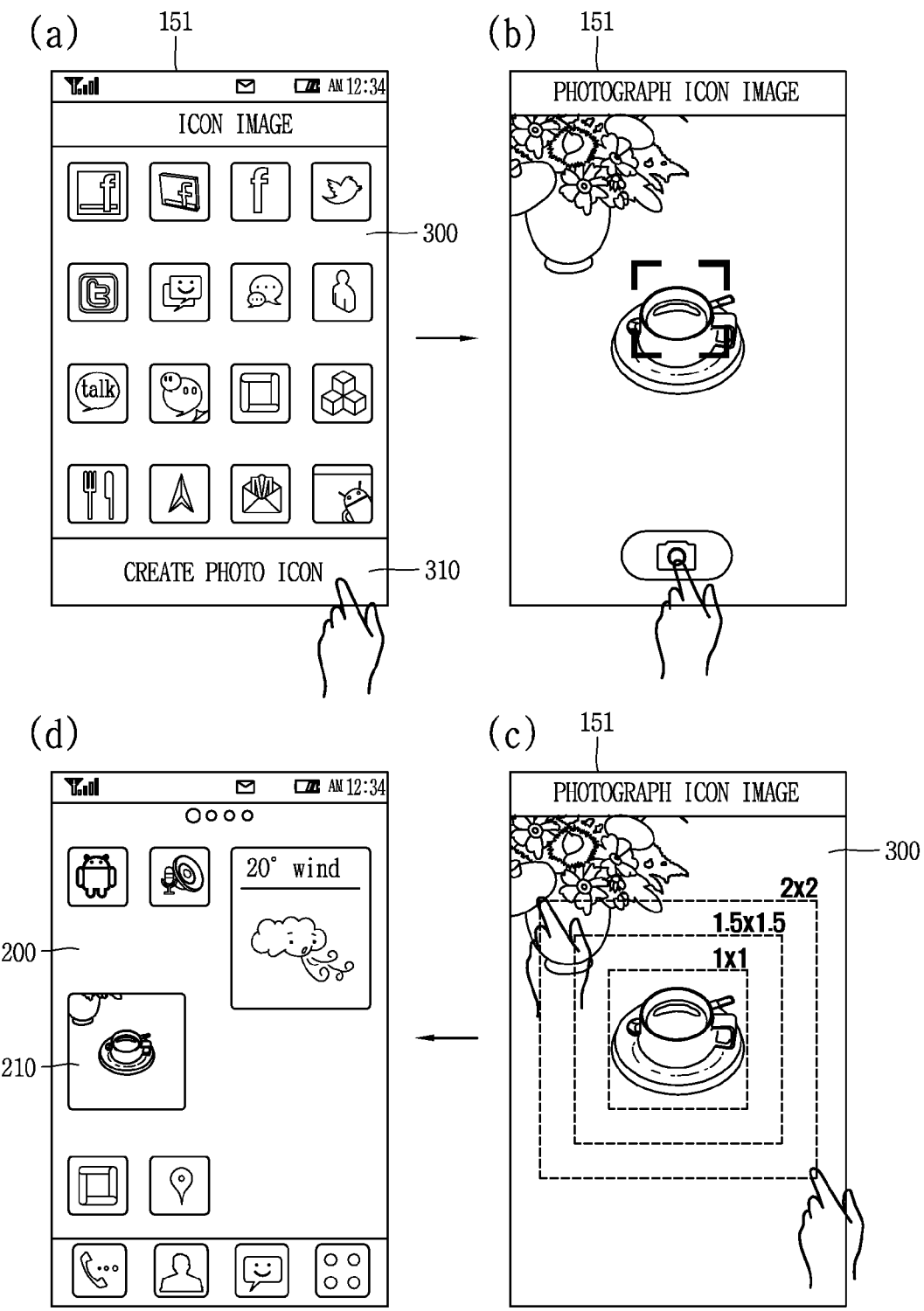

First, if an item 310 for photographing an image to be set as the image of the objective is selected through the editing screen 300 described in FIGS. 5A, 5B and 5C, the controller 180, as shown in FIG. 7C (a) and (b), may activate the camera 121. If an image corresponding to an image signal input through the camera 121 is photographed based on a user's selection, the controller 180, as shown in FIG. 7C (c), may receive a region to be displayed as the image of the objective in the photographed image 300, which is selected by the user.

The controller 180 may receive the size of the objective together with the region to be displayed as the image of the objective in the photographed image 300, which are selected by the user. For example, the controller 180, as shown in FIG. 7C (c), may display guide images respectively corresponding to different sizes of the objective on the photographed image 300. If any one of the displayed guide images is selected by the user, the controller 180, as shown in FIG. 7C (d), may change the size of the objective 210 to be edited into a size corresponding to the selected guide image.

The guide image shown in FIG. 7C (c) may be moved to an arbitrary region on the photographed image 300, based on a user's touch input.

Figure 7D:
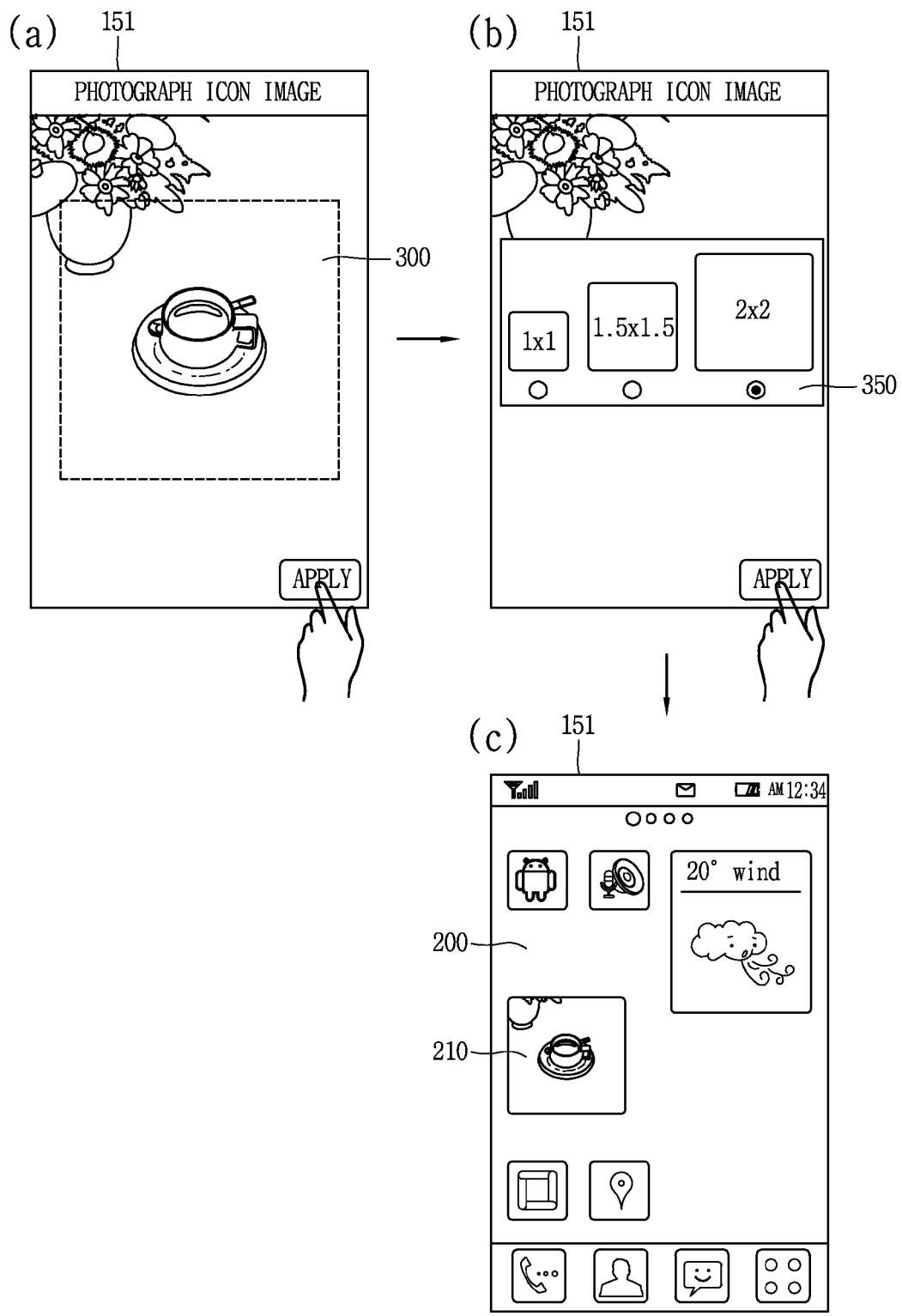

Meanwhile, after receiving a region to be displayed as the image of the objective in the photographed image 300, which is selected by the user, as shown in FIG. 7D (a), the controller 180, as shown in FIG. 7D (b), may receive a size of the objective, selected using a popup window 350. Therefore, if the size of the objective is selected through the popup window 350, the controller 180, as shown in FIG. 7C (c), may output, on the display unit 151, the objective 210 to be edited so as to have an image corresponding to the region selected from the photographed image and the selected size.

Figure 7E:
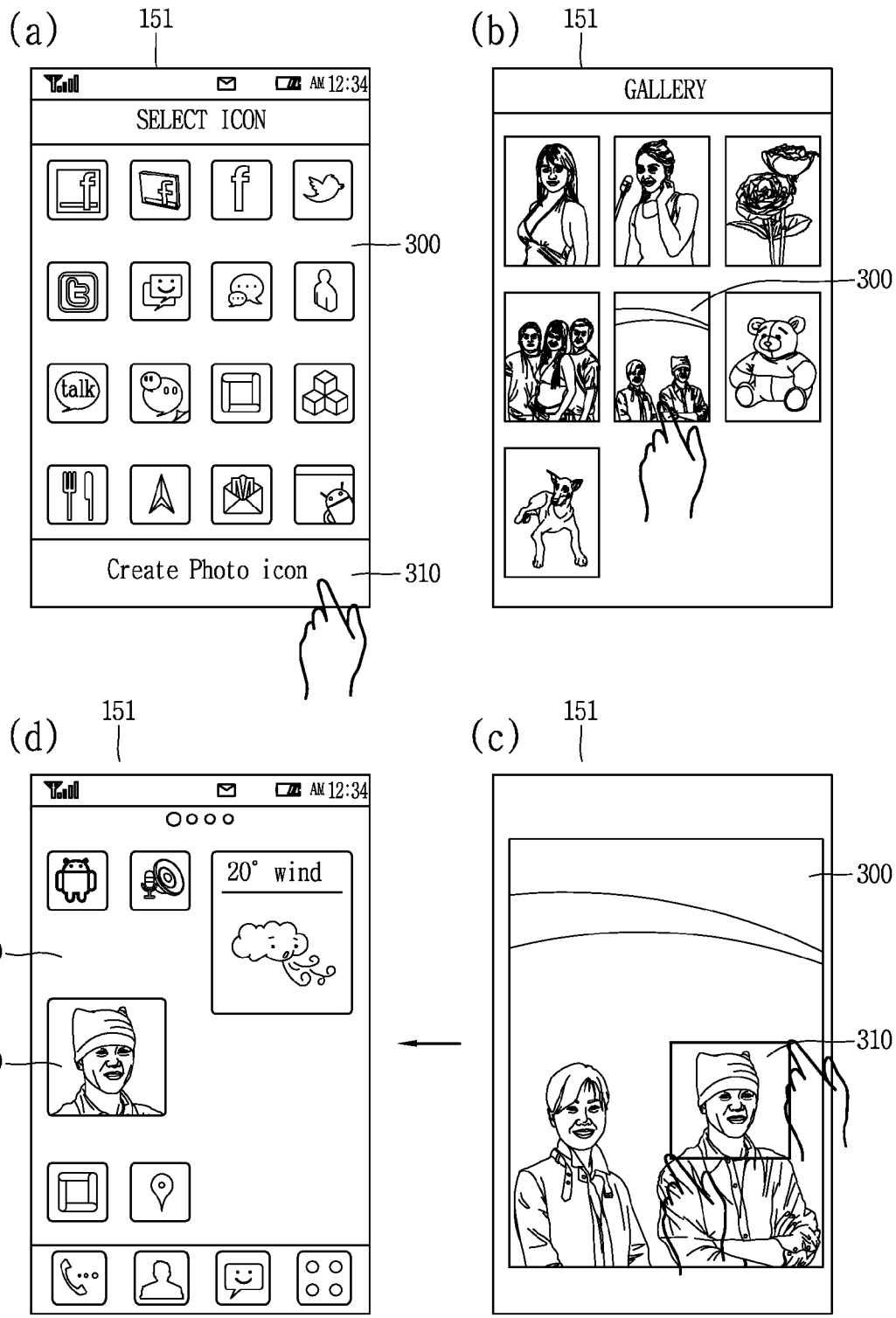

Another method for selecting an image and size of an objective to be edited will be described. As shown in FIGS. 7E (a) and (b), the controller 180 may receive any one of gallery images stored in the memory 160, which is selected by the user, and set the selected gallery image to the image of the objective. If any one 300 of the plurality of gallery images is selected by the user, the controller 180, as shown in FIG. 7E (c), receives one region 310 in the selected image 300, selected by the user, and sets an image corresponding to the selected region 310 to the image of the objective 210 to be edited. The controller 180 may set the size of the objective to a size corresponding to the region 310 selected by the user in the selected image 300. As described in FIG. 7D, the controller 180 may receive the image of the objective, set using the separate popup window.

As described above, in the mobile terminal according to the exemplary embodiment, the image of an objective can be variously changed, based on a user's selection, and simultaneously, the size of the objective can be changed.

Hereinafter, a method for providing information on the range in which the size of an objective to be edited is changeable or placing the objective, in consideration of another objective placed near the objective, will be described in detail with reference to the accompanying drawings. FIGS. 8A to 8F are conceptual views illustrating a method for placing an objective as the size of the objective is changed in the mobile terminal according to an exemplary embodiment.

In the mobile terminal according to the exemplary embodiment, when changing the size of an objective to be edited included in the home screen or menu screen, the controller 180 may determine a range in which the size of the objective is changeable, in consideration of the placement relationship between the objective to be edited and at least one objective placed near the objective to be edited. The controller 180 may provide a user with information on the range determined as described above.

Figure 8A:
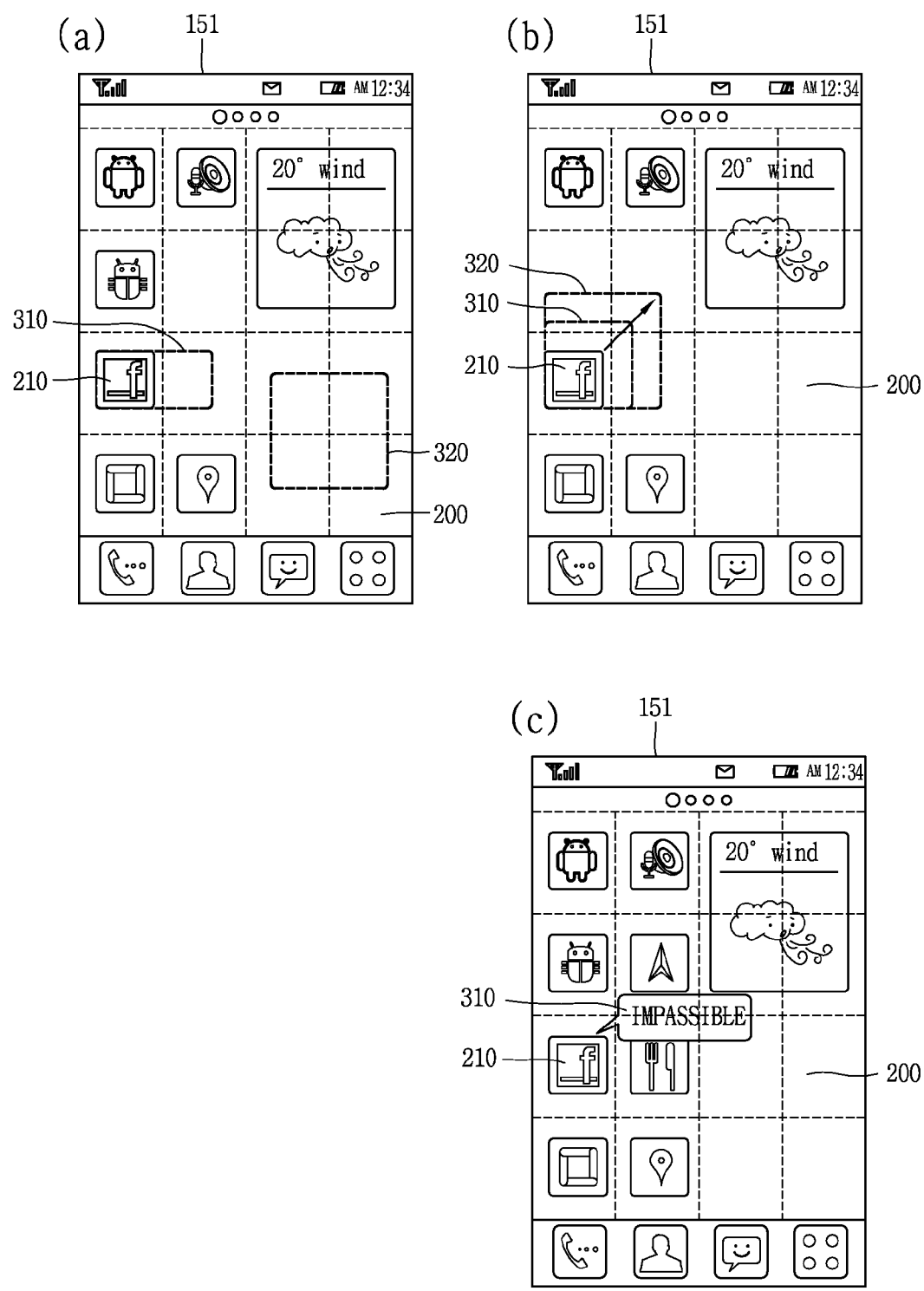

FIG. 8A will be described as an example. In a case where an objective 210 to be edited is an objective related to the 'Facebook' application, the controller 180 determines a range in which the size of the objective 210 to be edited is changeable, in consideration of the placement relationship between the objective 210 to be edited and another objective near the objective 210 to be edited on the home screen 200. The controller 180 controls the display unit 151 to output guide information in the determined range in which the size of the objective 210 to be edited is changeable.

For example, in a case where the objective 210 to be edited can be expanded in only a specific direction (e.g., in only a lateral direction) as shown in FIG. 8A (a), the controller 180 may display a guide image 310 for the expandable region on the display unit 151.

In a case where the objective to be edited is a three-dimensional objective, the controller 180 may provide guide information (or guide image) for the expandable region based on at least one of x, y and z axes.

In a case where the size of the current objective 210 to be edited can be expanded at a position different from that at which the current objective 210 to be edited is placed, the controller 180 may output information on the size changeable at the different position through a guide image 320.

As shown in FIG. 8A (b), the controller 180 may output guide images 310 and 320 respectively corresponding to ranges in which the size of the objective 210 to be edited is changeable.

In a case where it is impossible to change the size of the objective 210 to be edited as other objectives are all placed around the position at which the objective 210 to be edited is placed, the controller 180, as shown in FIG. 8A (c), may output notification information for notifying the user that it is impossible to change the size of the objective 210 to be edited, using a popup window 310. The notification information may be output through voice or vibration, as well as the popup window 310.

Meanwhile, in a case where the position of the objective 210a to be edited is overlapped with that of another objective placed near the objective 210a to be edited when the size of the objective 210a to be edited is changed, the controller 180 may move the another objective.

Figure 8B:
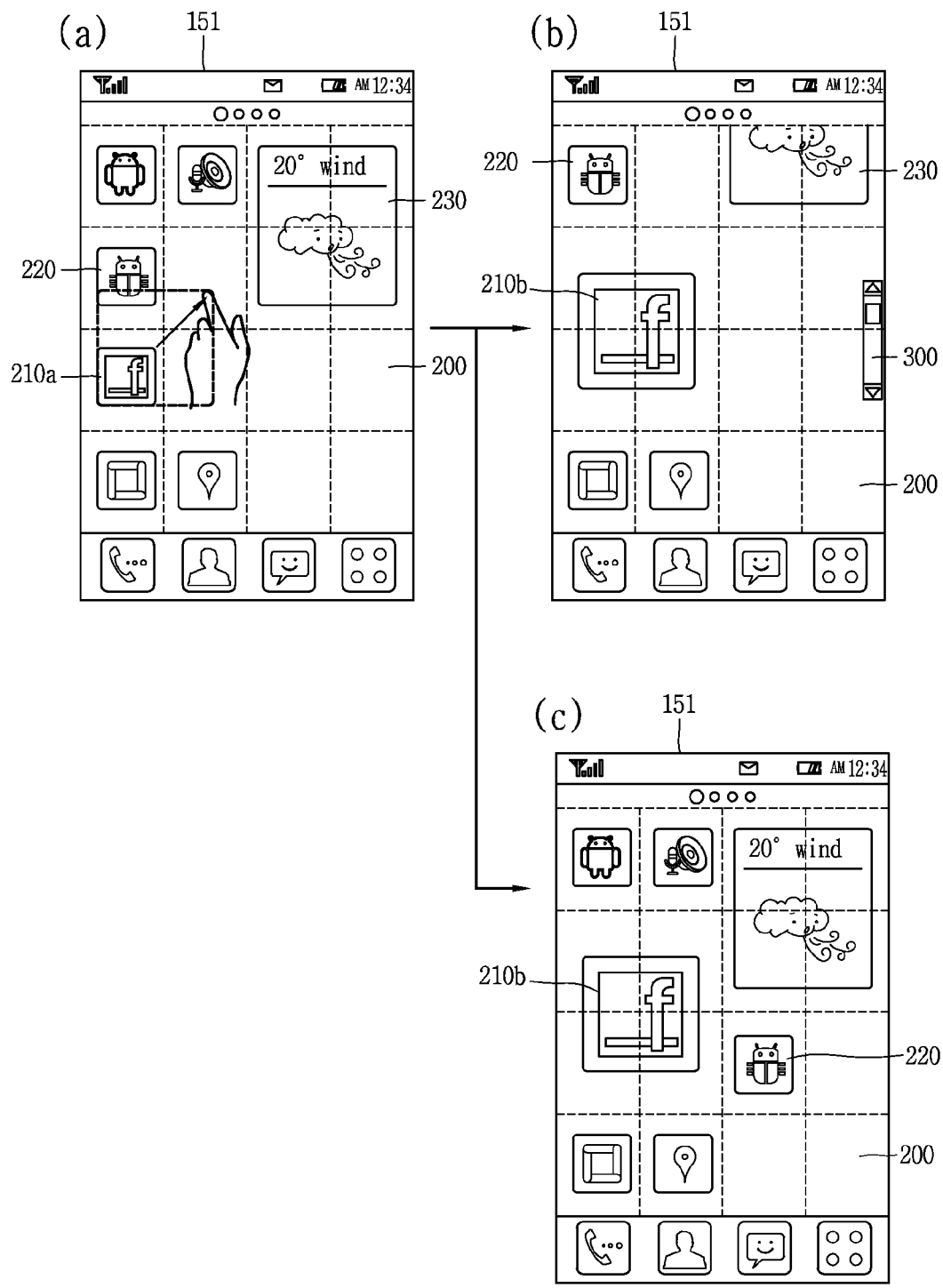

As an example, in a case where the objective 210a to be edited is overlapped with an objective 220 above the objective 210a to be edited due to the enlargement of the objective 210a to be edited as shown in FIG. 8B (a), the controller 180, as shown in FIG. 8B (b), may enlarge the size of the objective 210a to be edited by expanding the home screen 200. In this case, the controller 180 may move the objectives 220 and 230, which have been placed on the row where the enlarged objective 210a to be edited is placed, to another row or another position on the home screen 200.

The controller 180 may control the display unit 151 so that a scroll bar 300 is displayed on the display unit 151, based on that the home screen 200 is expanded.

As another example, in a case where the objective 210a to be edited is overlapped with the objective 220 placed above the objective 210a to be edited due to the enlargement of the objective 210a to be edited, the controller 180, as shown in FIG. 8B (c), may display the enlarged objective 210a to be edited, and move the objective 220 to an empty region on the home screen 200 or to another home screen.

Figure 8C:
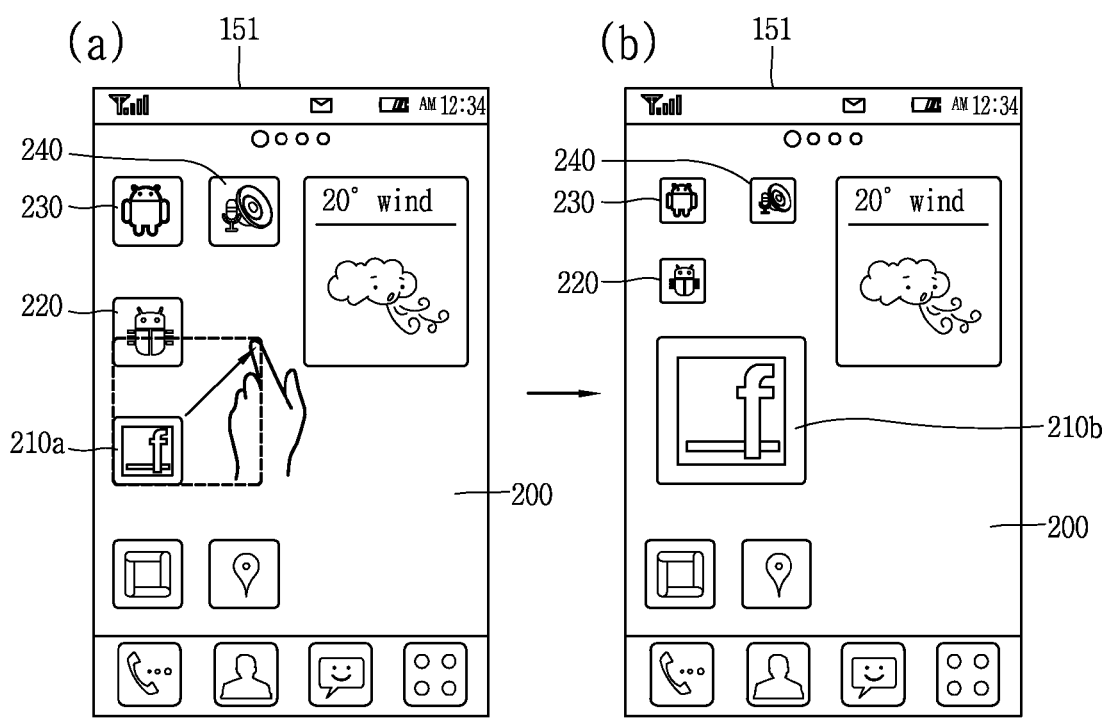

As still another example, in a case where the region in which the objective 210a to be edited can be enlarged is deficient due to other objectives 220, 230 and 240 displaced near the objective 210a to be edited as shown FIG. 8C (a), the controller 180, as shown in FIG. 8C (b), may relatively reduce the sizes of the other objectives 220, 230 and 240 placed near the enlarged objective 210b.

As still another example, in a case where the size of the objective 210a to be edited is changed, the controller 180 may move objectives placed on the home screen so that the arrangement of the objectives placed on the home screen can become a visually stabilized arrangement.

For example, in a case where the size of the objective to be edited is enlarged (210a→210b) as shown in FIGS. 8D (a) and (b), the controller 180 may change the arrangement of other objectives placed near the edited objective 210*b*. The controller 180 may place an objective 260 having the same size as the edited objective 210*b* on the same row as the edited objective 210*b*. The controller 180 may arrange objectives 220, 230, 240 and 250 each having a smaller size than the edited objective 210*b* in a row above the edited objective 210*b*.

As such, the controller 180 arranges objectives having similar sizes on the same row or in adjacent regions, so that the user can feel that the arrangement of the objectives placed on the home screen has been visually stabilized.

As still another example, in a case where the size of the objective 210 to be edited is changed, the controller 180 may display an objective corresponding to the application related to the objective 210 to be edited together with the objective 210 to be edited.

Figure 8E:
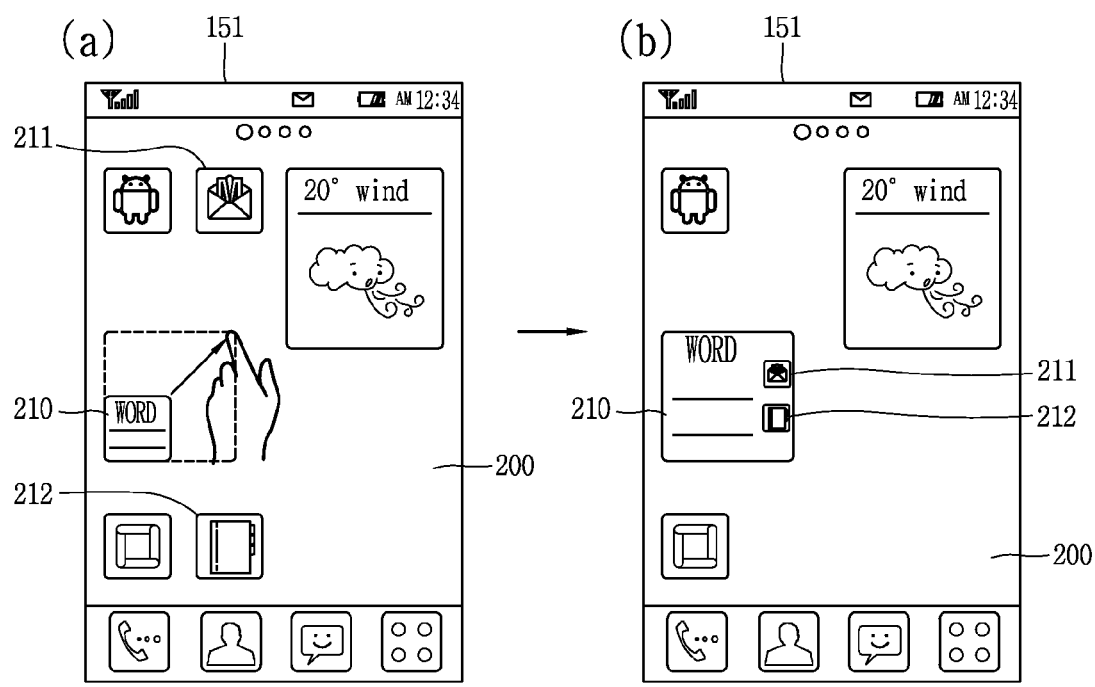

For example, in a case where a word processor application as an 'Office' related application is enlarged as shown in FIG. 8E (a), the controller 180, as shown in FIG. 8E (b), may output objectives 211 and 212 respectively corresponding to a memo application and a mail application as 'Office' related applications to be overlapped in one region of the objective 210 corresponding to the enlarged word processor application.

If a touch input is applied to any one of the objectives 211 and 212 overlapped with the enlarged objective 210, the controller 180 may execute an application corresponding to the objective to which the touch input is applied.

In a case where the objectives 211 and 212 respectively corresponding to the memo application and the mail application as the 'Office' related applications are overlapped with the objective 210 to be edited, the objectives respectively corresponding to the memo application and the mail application, which have been output on the home screen before the objectives 211 and 121 are overlapped with the objective 210 to be edited, may not be output any more on the home screen.

Figure 8F:
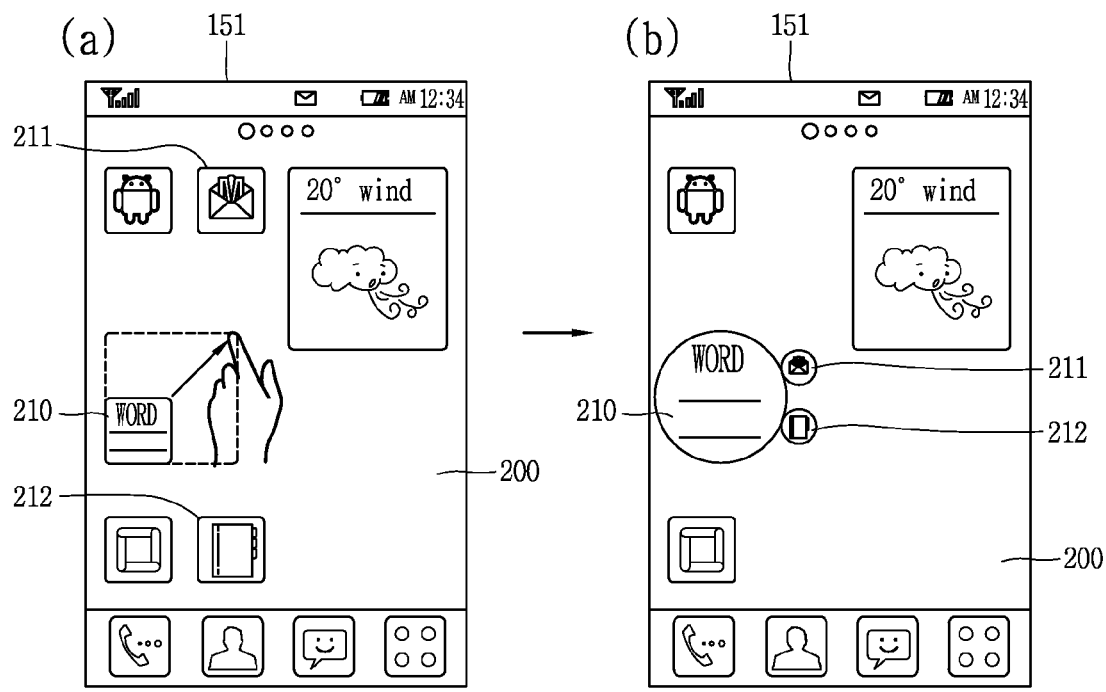

The controller 180, as shown in FIG. 8F (b), may place the objectives 211 and 212 respectively corresponding to the memo application and the mail application as the 'Office' related applications to be adjacent to the objective corresponding to the enlarged word processor application so that the objective 210 has a predetermined shape (e.g., a 'grape' shape) for the purposed of visual amusement.

As described above, in the mobile terminal according to the exemplary embodiment, when another objective is enlarged, an objective corresponding to an application related to the enlarged objective is displayed adjacent to the enlarged objective, so that it is possible to save the space in which the objective corresponding to the application is placed and to improve the convenience of entry into a relative application.

In the aforementioned exemplary embodiments, the method for changing the size of a specific objective, based on a user's touch input to the objective, has been described. Hereinafter, a method for collectively changing the size of at least one objective, based on status information or ambient environment information of the mobile terminal, will be described in detail with reference to the accompanying drawings. FIGS. 9A to 9D are conceptual views illustrating a method for changing the size of an objective based on status information in the mobile terminal according to an exemplary embodiment.

In the mobile terminal according to the exemplary embodiment, the controller 180 may change the size of an objective on the home screen, based on at least one of an output mode selected by a user through a voice recognition, touch input or proximity touch input (or non-contact touch input) (see FIG. 9C), a place at which the current mobile terminal is positioned, recognized through a near field communication (NFC) tag (see FIG. 9B), a current position of the mobile terminal, obtained through an assisted GPS (A-GPS) or GPS, and weather information obtained through an application.

That is, the controller 180 may display an objective corresponding to an application having a high possibility to be used according to the status information or ambient situation of the current mobile terminal so as to be larger than that corresponding to another application. On the contrary, the controller 180 may display an objective corresponding to an application having a low possibility to be used according to the status information or ambient situation of the current mobile terminal so as to be smaller than that corresponding to another application.

Figure 9A:
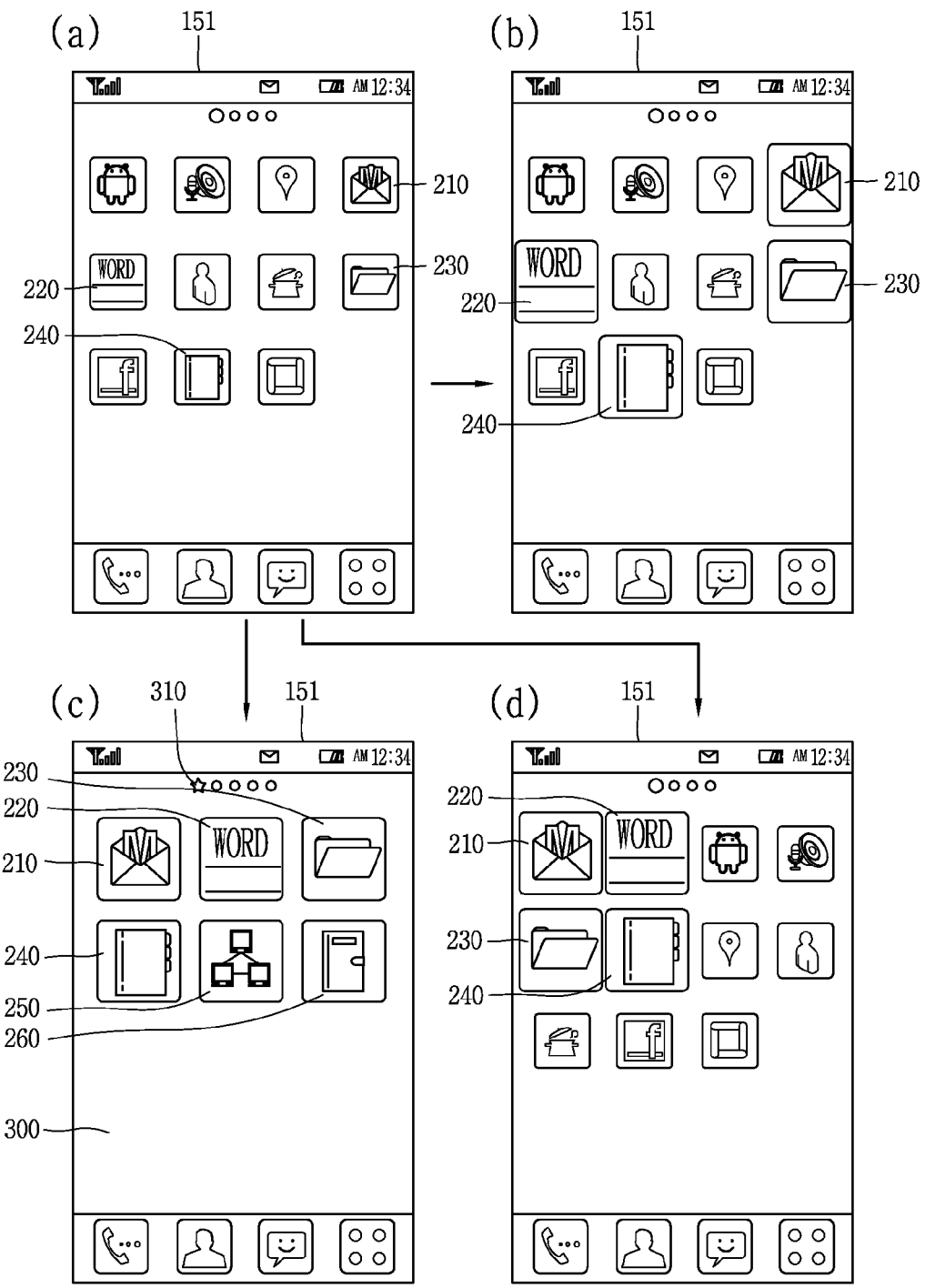
Figure 9C:
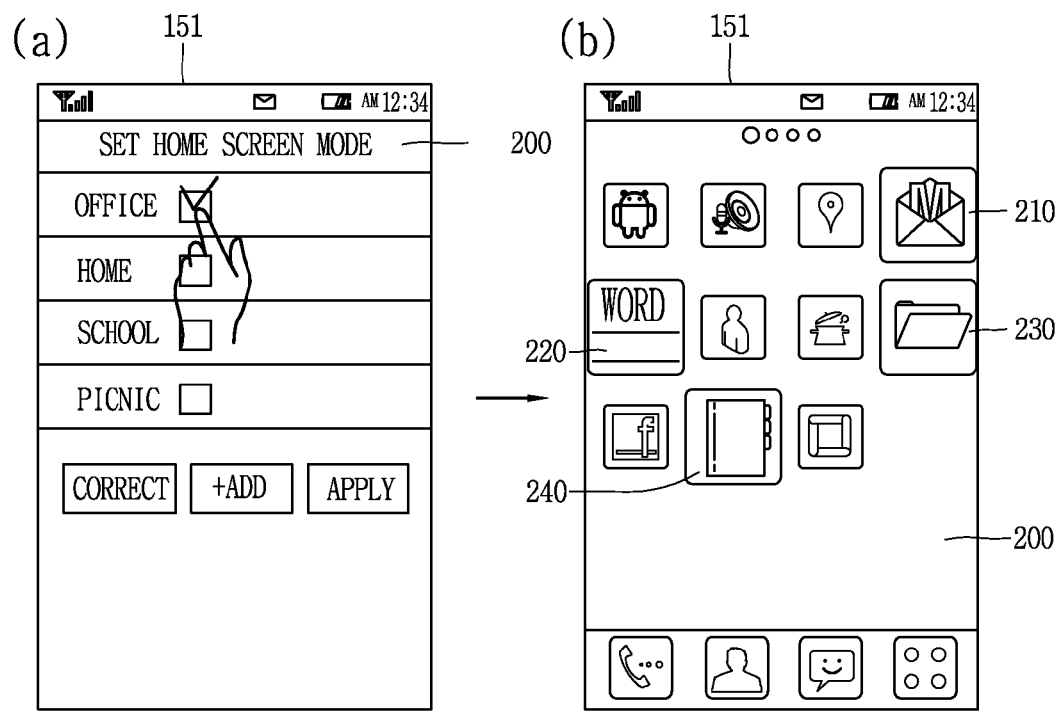

For example, in a case where the current terminal is placed in a 'company' as shown in FIG. 9A (a), the controller 180, as shown in FIG. 9A (b), may display objectives 210, 220, 230 and 240 respectively corresponding to a mail application, a word processor application, a file search application and a memo application, which are applications related to company affairs, placed on the home screen, so as to be larger than other objectives.

The controller 180, as shown in FIG. 9A (d), may display the objectives 210, 220, 230 and 240 respectively corresponding to the applications related to the place at which the current terminal is positioned to be adjacent to one another.

As shown in FIG. 9A (c), the controller 180 may generated a new home screen 300, and different home screens may be included on the newly generated home screen 300. The controller 180 may control the display unit 151 to display together the objectives 210, 220, 230 and 240 respectively corresponding to the applications related to the place at which the current terminal is positioned. The controller 180 may notify the user that the new home screen has been generated by displaying identification information 310 on the newly generated home screen.

Figure 9D:
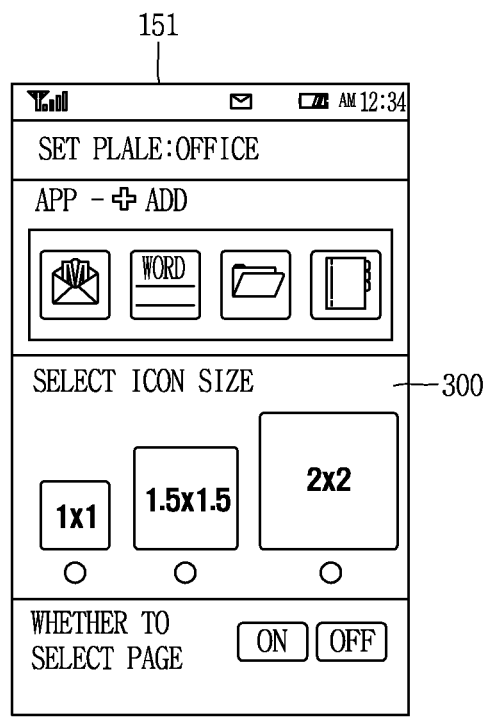

Meanwhile, the user may newly configure or change the place at which the size of an objective is changed through a configuration screen 300 shown in FIG. 9D, and may add or delete an application in which the size of the objective is to be changed at the configured place or position. The user may configure the size of the objective to be changed and select the presence of generation of a new home screen, through the configuration screen 300. In addition to the configuration shown in FIG. 9D, the user may perform various configurations for changing the size of the objective according to the status information or ambient environment information of the mobile terminal.

As described above, in the mobile terminal according to the exemplary embodiment, the sizes of objectives respectively corresponding to applications having a high possibility to be executed are collectively enlarged according to the situation of the mobile terminal, so that the user can reduce the time required to search for an objective so as to execute an application.

Figure 10A:
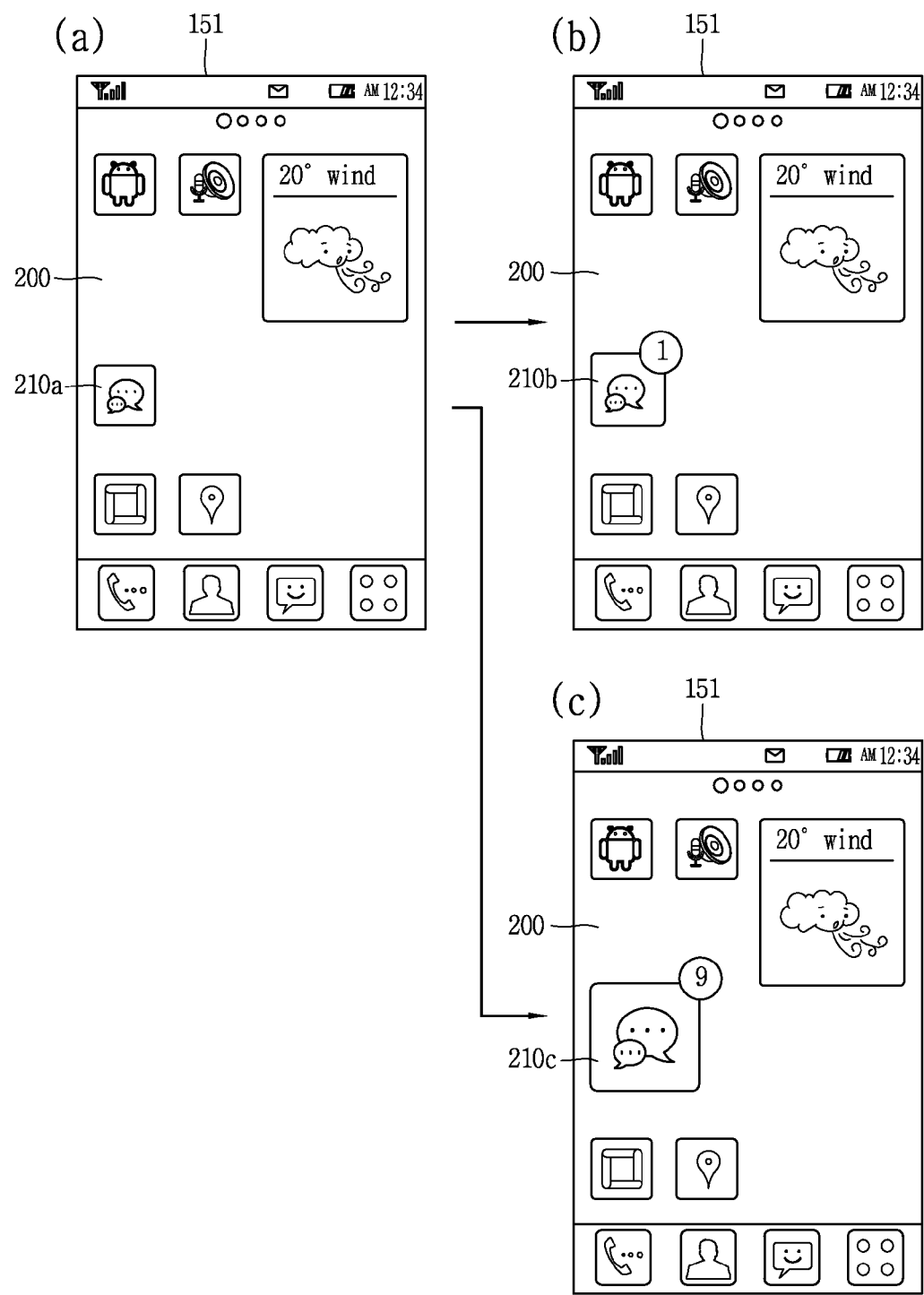
FIGS. 10A and 10B and 10C are conceptual views illustrating a method for changing the size of an objective as an event occurs in the mobile terminal according to an exemplary embodiment.
Figure 10B:
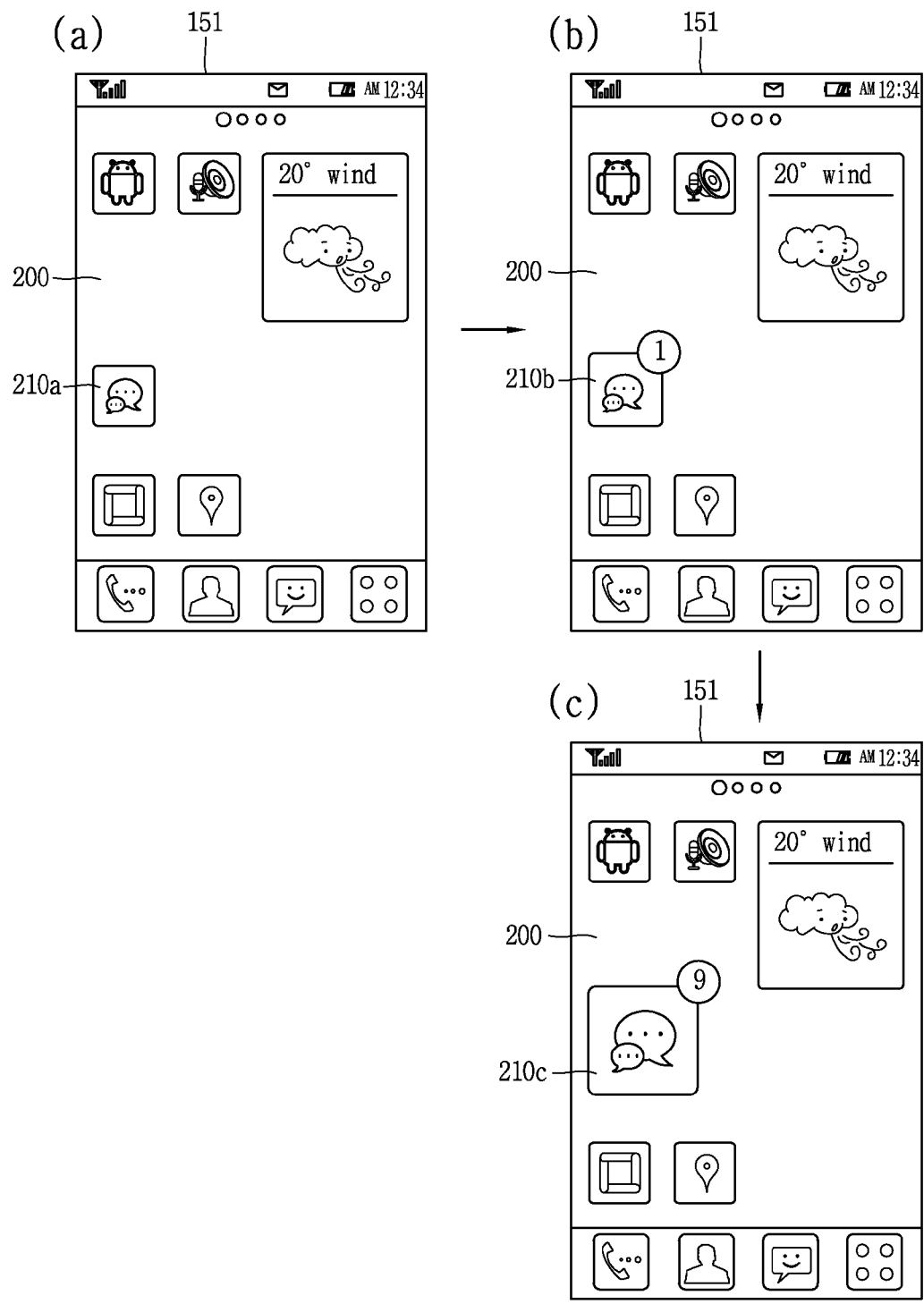
Figure 10C:
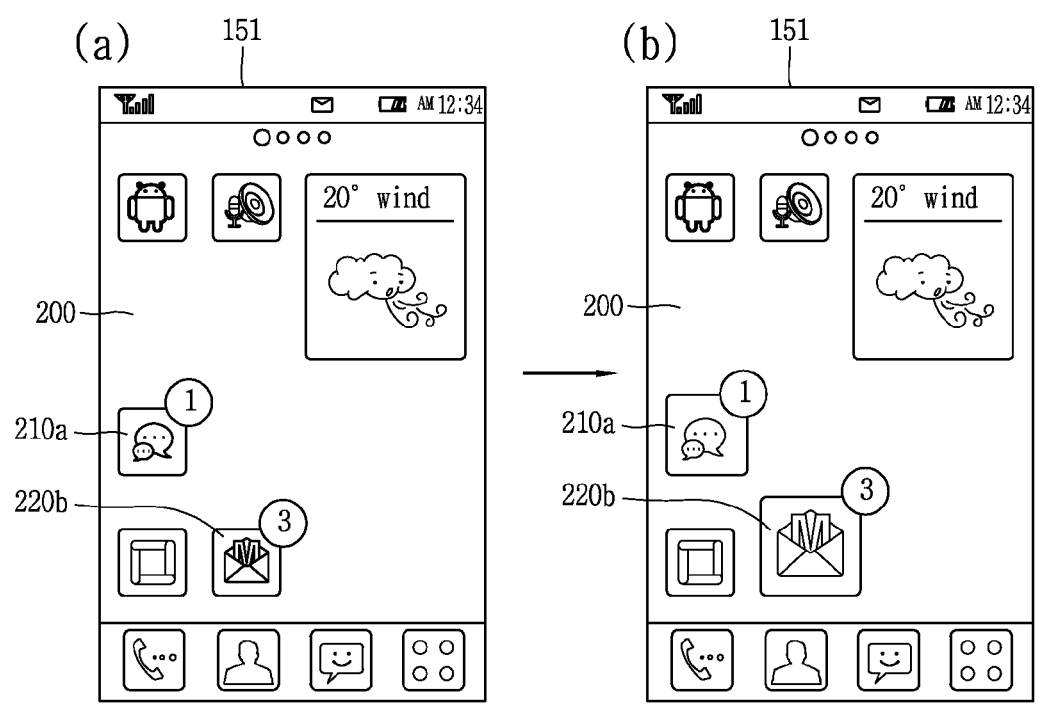

Hereinafter, a method for changing the size of an objective, based on that an event occurs in an application, will be described in detail with reference to the accompanying drawings. FIGS. 10A and 10B are conceptual views illustrating a method for changing the size of an objective as an event occurs in the mobile terminal according to an exemplary embodiment.

In the mobile terminal according to the exemplary embodiment, when an event occurs in an application, the controller 180 displays an objective corresponding to the application in which the event occurs to be further enlarged than other objectives, so that a user can easily identify the application in which the event occurs.

As an example, in a case where an event occurs in a message related application as shown in FIG. 10A, the controller 180 may display an objective 210b (see FIG. 10A (b)) corresponding to the message related application to be larger than an objective 210a (see FIG. 10A (a)) corresponding to the message related application before the event occurs.

As shown in FIGS. 10B (a), (b) and (c), the controller 180 may provide the user with information on the frequency at which the event occurs by gradually enlarging the size of the objective displayed as the number of events increases (210a→210b→210c).

As described above, in the mobile terminal according to the exemplary embodiment, the size of the objective is changed, so that the user can easily identify the application in which the event occurs.

Hereinafter, another exemplary embodiment of the method for changing the size of the objective output on the home screen will be described in detail with reference to the accompanying drawings. FIGS. 11A to 11D are conceptual views illustrating a method for changing at least one of the size and image of an objective in the mobile terminal according to an exemplary embodiment.

As described above, in the mobile terminal according to the exemplary embodiment, the controller 180 may execute the edition mode for changing at least one of the size and image of any one of at least one objective, based on a user's touch input to the at least one objective output on the home screen 200.

If a touch input using a predetermined method is applied to any one objective 210 on the home screen 200 as shown in FIG. 11A (a), the controller 180, as shown in FIG. 11A (b), may change the exterior appearance of the objective 210 so as to notify the user that the edition mode for changing at least one of the size and image of the objective 210 has been executed. That is, the controller 180 outputs a notification message 211 for notifying the user that the edition mode has been executed on one region of the objective 210 or a region adjacent to the objective 210.

That is, if a first touch input to any one 210 of the objectives output on the display unit 151 is sensed, the controller 180 may execute an application related to the objective 210. If a second touch input to the objective 210 of the objectives output on the display unit 151 is sensed, the controller 180, as shown in FIG. 11A (b), may execute the edition mode for changing attribute information of the objective, in response to the second touch input.

Here, the first touch input may be a single touch (or tab touch) input having a maintenance time less than a reference time, and the second touch input may be a long touch or long press touch input having a maintenance time more than the reference time.

That is, the controller 180 may perform different functions related to the objective according to the maintenance time of the touch input to the objective. In this case, the controller 180 may count the time when the touch input is maintained and then generate different control commands, in response to the time when the touch input to the objective is released.

As such, the first and second touch inputs may be different touch inputs using the predetermined method. In addition to the touch method described above, the first and second touch inputs may be defined using various touch methods. At least one of the first and second touch inputs may be received through a user's gesture (or behavior), using the proximity sensor 141 included in the sensing unit 140. That is, the controller 180 may receive at least one of the first and second touch inputs, input through a proximity touch (or non-contact touch) on the display unit 151. The drag, pinch-in or pinch-out input touch described above may also be input through the proximity touch (or non-contact touch) on the display unit 151.

As such, that different controls are performed according to the kind of the touch input is provided for the purpose that the user selects the objective output on any one of the idle screen, the home screen and the menu screen, thereby executing a function expected by the user. That is, the user's touch input for selecting the objective output on any one of the idle screen, the home screen and the menu screen generally results from the intention to execute the application related to the objective. Thus, in order to distinguish the intention from a user's intention to change the size of the objective, the controller 180 analyzes the maintenance time and pattern of a touch input applied to the objective, and generates different control commands for the objective, based on the analyzed result.

Meanwhile, if any one objective 210 is selected by the user in the sate in which the edition mode is executed as shown in FIG. 11A (b), the controller 180, as shown in FIG. 11A (c), outputs an editing screen 300 for changing at least one of the size and image of the objective 210 on the display unit 151.

That is, the controller 180 generates a control command for outputting the editing screen 300, based on a touch input to the objective 210. Particularly, in a touch input is applied to the notification image 211 as shown in FIG. 11A (b), the controller 180, as shown in FIG. 11A (c), may output the editing screen 300 on the display unit 151. Although the touch input is applied to a portion of the objective 210 except the notification image 211, the controller 180 may generate the control command for outputting the editing screen 300 on the display unit 151.

Meanwhile, as shown in FIGS. 11A (c) and (d), the editing screen 300 may be configured with a plurality of pages. The plurality of pages may be classified, based on the size of images, and images having the same size are included on the same page. For example, in a case where first, second and third pages exist, a plurality of different images having a size of 1×1 may be included on the first page, and a plurality of different images having a size of 2×2 may be included on the second page. A plurality of different images having a size of 3×3 may be included on the third page.

As shown in FIG. 11A (c), icons 301 and 302 for changing the current page into different pages are included on the editing screen 300, and the number of icons corresponds to the number of pages.

If the icon 302 for allowing the page corresponding to the size of 2×2 to be displayed on the display unit 151 is selected by the user as shown in FIG. 11A (c), the controller 180, as shown in FIG. 11A (d), may control the display unit 151 to output a page 320 on which images having the size of 2×2 are included.

Figure 11B:
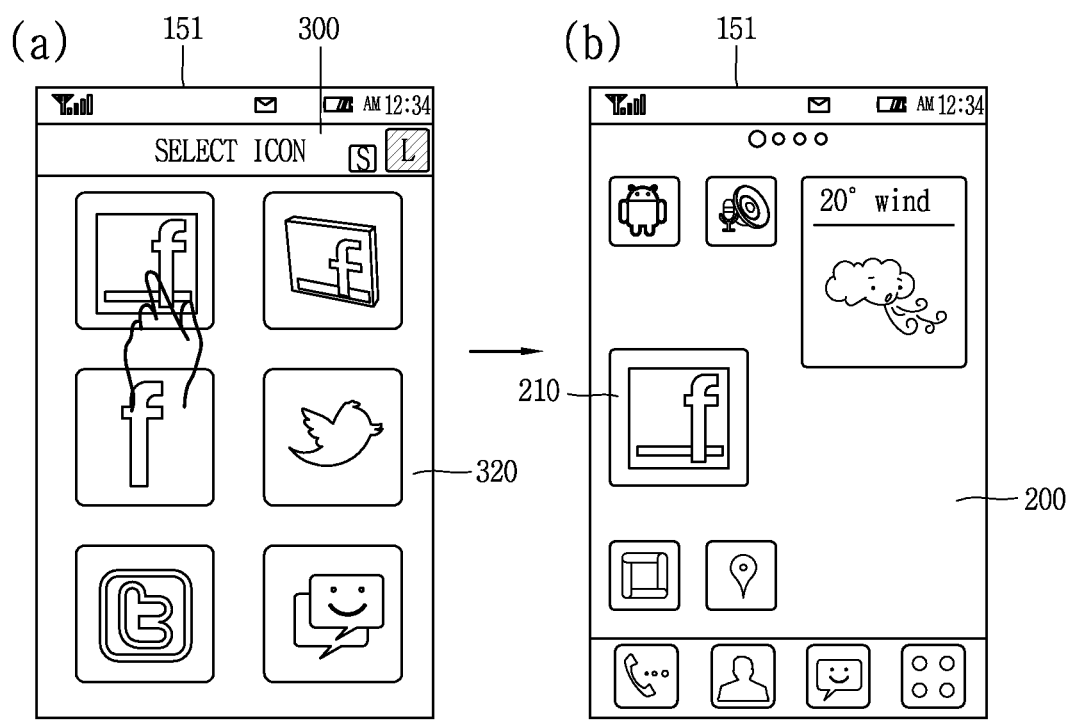

Meanwhile, if any one image 321 is selected by the user on the page 320 in which the images having the size of 2×2 are included as shown in FIG. 11B (a), the controller 180, as shown in FIG. 11 (b), may change the exterior appearance of the objective 210 to be edited (see FIGS. 11A (a) and (b)) to have the selected image 321 and the size corresponding to the selected image 321, and output the objective 210 on the home screen 200.

Although not shown in this figure, the controller 180, as described in FIG. 5C, may control the display unit 151 to output the preview screen so that the user can previously see an objective to be changed into the selected image and the size corresponding to the selected image.

Figure 11C:
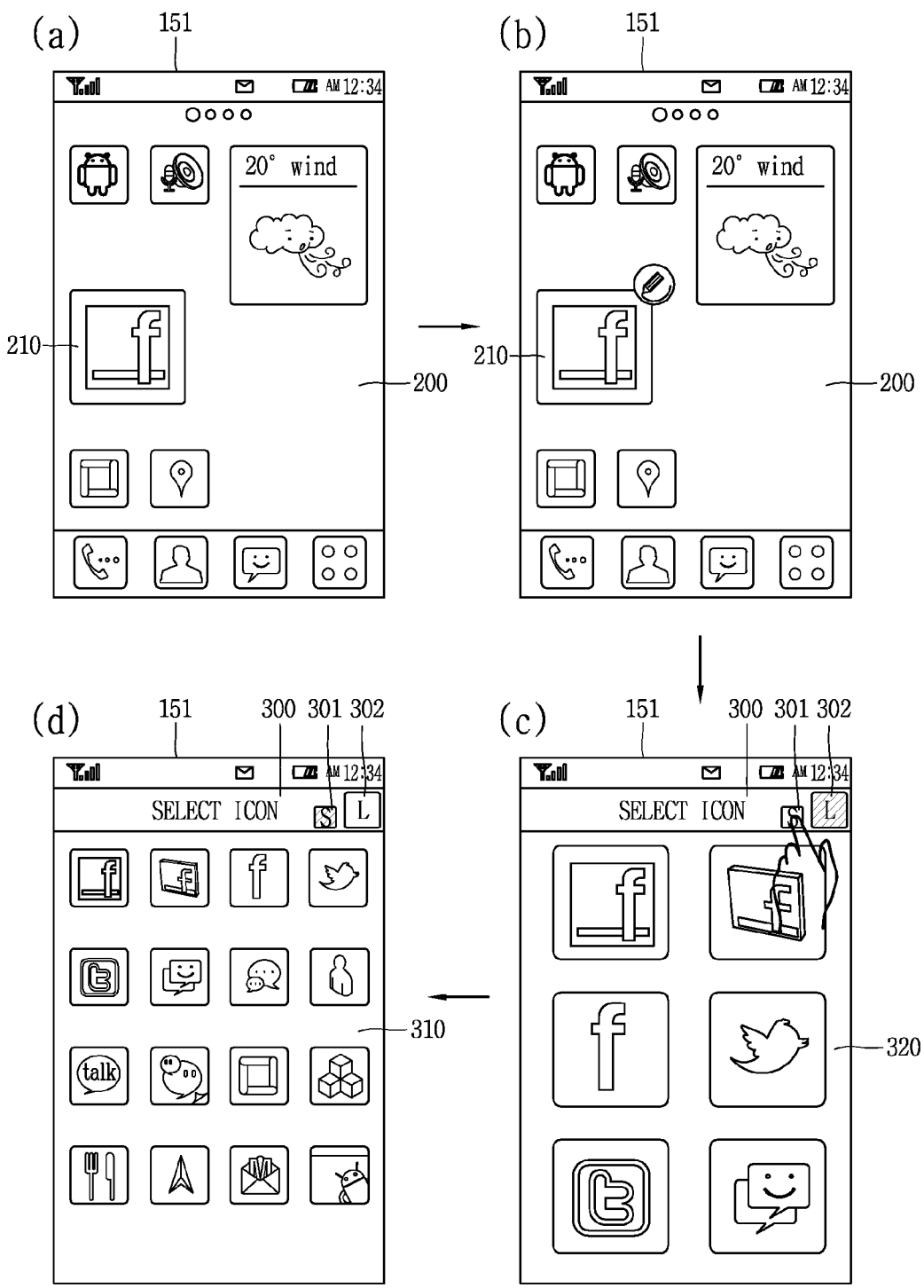

If a touch input for executing the edition mode is applied to the objective 210 of which size is changed into the size of 2×2 in FIG. 11B (see FIG. 11C (a)), the controller 180, as shown in FIG. 11C (b), executes the edition mode on the objective 210.

When the edition screen is output, based on that the edition mode is executed, the controller 180 may first output, on the display unit 151, a page on which the objective 210 to be edited has information on the same size as that output on the current home screen 200 among the plurality of pages respectively matched to different sizes.

Thus, in a case where the editing screen 300 is output as shown in FIG. 11O (c), the controller 180 first outputs the page 320 including images having the size of 2×2, rather than another page 310. Similarly, in a case where the editing screen 300 is output as shown in FIG. 11A (c), it can be seen that the images corresponding to the size of 1×1 that is the size of the objective 210 to be edited (see FIG. 11A (a)) on the display unit 151.

In a case where the page 310 matched to a size different from that of the currently output page 320 is output as described in FIGS. 11B (c) and (d), the controller 180, as shown in FIGS. 11C (c) and (d), may change the page 320 into the page 310, using the icons 301 and 302 for changing the current page into different pages.

Figure 11D:
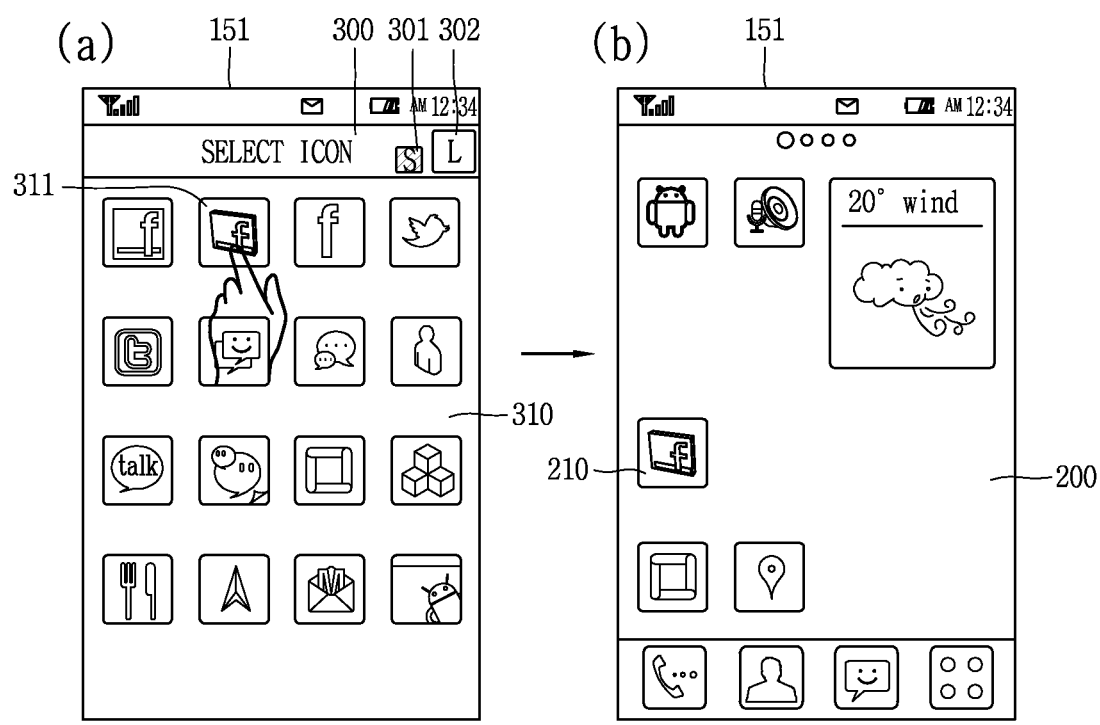

Meanwhile, if any one image 311 is selected by the user on the page 310 including images having the size of 1×1 as shown in FIG. 11D (a), the controller 180, as shown in FIG. 11D (b), changes the exterior appearance of the objective 210 to be edited (see FIGS. 11C (a) and (b) to have the selected image 311 and the size corresponding to the selected image 311, and output the objective 210 on the home screen 200.

As described above, in the mobile terminal according to the exemplary embodiment, when the user desired to change the size of an objective output on the home screen, the user selects any one image on the page (e.g., the page 320 shown in FIG. 11A (d)) including images corresponding to information a size different from that of the objective output on the current home screen, so that it is possible to change at least one of the image and size of the objective.

Figure 12B:
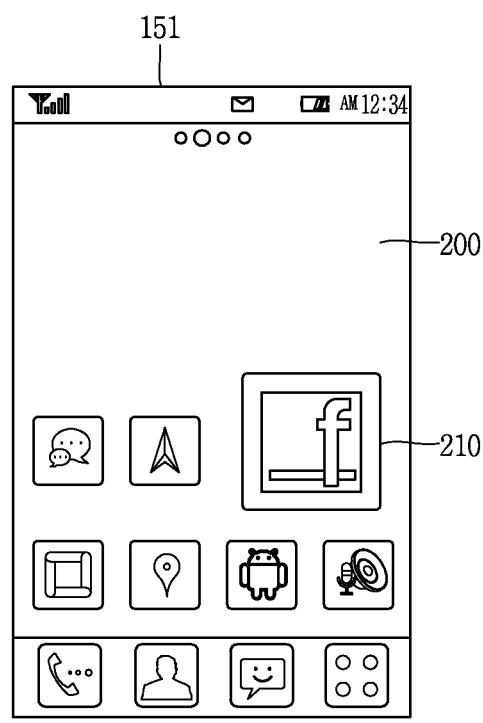
Figure 12C:
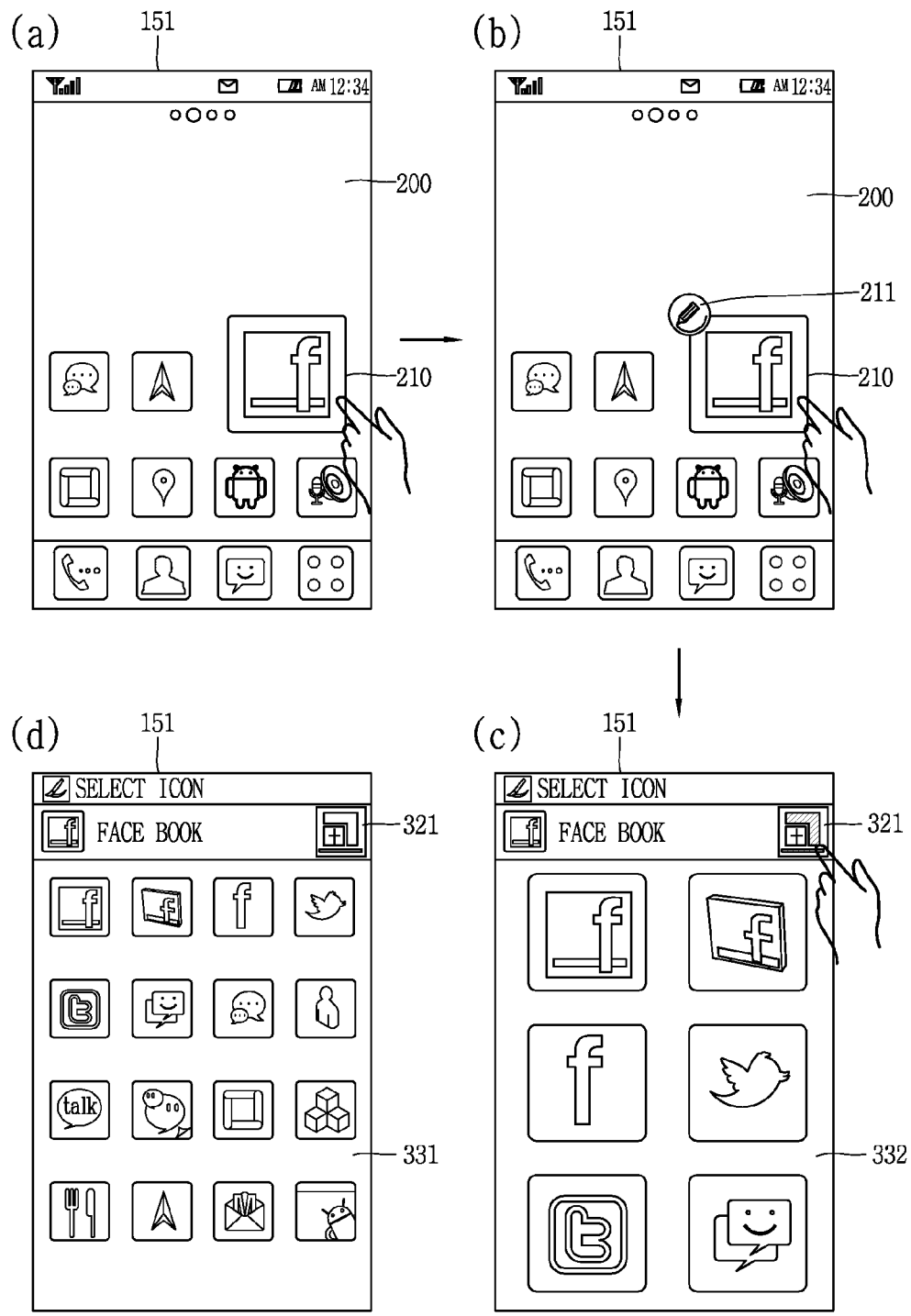

Hereinafter, another exemplary embodiment of the method for changing the size of an objective output on the home screen will be described in detail with reference to the accompanying drawings. FIGS. 12A to 12C are conceptual views illustrating a method for setting the image and size of an objective through a plurality of pages corresponding to different size information in the mobile terminal according to an exemplary embodiment.

As described above, in the mobile terminal according to the exemplary embodiment, the controller 180 may execute the edition mode for changing at least one of the size and image of any one of at least one objective, based on a user's touch input to the at least one objective output on the home screen 200.

If a touch input using a predetermined method is applied to any one objective 210 on the home screen 200 as shown in FIG. 12A (a), the controller 180, as shown in FIG. 12A (b), may change the exterior appearance of the objective 210 so as to notify the user that the edition mode for changing at least one of the size and image of the objective 210 has been executed. That is, the controller 180 outputs a notification message 211 for notifying the user that the edition mode has been executed on one region of the objective 210 or a region adjacent to the objective 210.

That is, if a first touch input to any one 210 of the objectives output on the display unit 151 is sensed, the controller 180 may execute an application related to the objective 210. If a second touch input to the objective 210 of the objectives output on the display unit 151 is sensed, the controller 180, as shown in FIG. 12A (b), may execute the edition mode for changing attribute information of the objective, in response to the second touch input.

Here, the first touch input may be a single touch (or tab touch) input having a maintenance time less than a reference time, and the second touch input may be a long touch or long press touch input having a maintenance time more than the reference time.

That is, the controller 180 may perform different functions related to the objective according to the maintenance time of the touch input to the objective. In this case, the controller 180 may count the time when the touch input is maintained and then generate different control commands, in response to the time when the touch input to the objective is released.

As such, the first and second touch inputs may be different touch inputs using the predetermined method. In addition to the touch method described above, the first and second touch inputs may be defined using various touch methods. At least one of the first and second touch inputs may be received through a user's gesture (or behavior), using the proximity sensor 141 included in the sensing unit 140.

That is, the controller 180 may receive at least one of the first and second touch inputs, input through a proximity touch (or non-contact touch) on the display unit 151. The drag, pinch-in or pinch-out input touch described above may also be input through the proximity touch (or non-contact touch) on the display unit 151.

As such, that different controls are performed according to the kind of the touch input is provided for the purpose that the user selects the objective output on any one of the idle screen, the home screen and the menu screen, thereby executing a function expected by the user. That is, the user's touch input for selecting the objective output on any one of the idle screen, the home screen and the menu screen generally results from the intention to execute the application related to the objective. Thus, in order to distinguish the intention from a user's intention to change the size of the objective, the controller 180 analyzes the maintenance time and pattern of a touch input applied to the objective, and generates different control commands for the objective, based on the analyzed result.

Meanwhile, if any one objective 210 is selected by the user in the sate in which the edition mode is executed as shown in FIG. 12A (b), the controller 180, as shown in FIG. 12A (c), outputs an editing screen 300 for changing at least one of the size and image of the objective 210 on the display unit 151.

That is, the controller 180 generates a control command for outputting the editing screen 300 on the display unit 151, based on the touch input to the objective 210. As an example, in a case where a touch input is applied to the notification image 211, the controller 180, as shown in FIG. 12A (c), may output the editing screen 300 on the display unit 151. Although the touch input is not applied to the notification image 211 but applied to the objective 210, the controller 180 may generate the control command for outputting the editing screen 300 on the display unit 151.

Meanwhile, the editing screen 300 may be provided as a clean view screen on which a status bar for displaying status information (time information, information on an event occurrence application, antenna information, battery information, etc.) of the mobile terminal is not output.

The editing screen 300 may be divided into a plurality of regions. As shown in FIG. 12A (c), information 'selection icon' is output on a first region 310, so that mode information for notifying the user that the current status of the mobile terminal is in the edition mode can be output.

Information on the objective 210 to be edited may be output on a second region 320. Here, the information on the objective 210 to be edited may include image information of the objective to be currently edited and information on an application corresponding to the objective 210 to be edited.

Image item information for changing at least one of the image and size of the objective 210 to be edited may be output on a third region 330.

The editing screen 300 will be more specifically described. As shown in FIGS. 12A (c) and (d), the editing screen 300 is configured with a plurality of pages. As an example, the plurality of pages may be output particularly on the third region 330 (hereinafter, the region on which the plurality of pages are displayed is not limited to the third region 330, and is commonly referred to as the 'editing screen 300').

Meanwhile, the plurality of pages are classified, based on the size of objectives to be displayed on the home screen.

That is, image items included in the same page have the same size information. For example, in a case where first and second pages exist, a plurality of different image items having information on a size of 1×1 are included on the first page, and a plurality of different image items having information on a size of 2×2 are included on the second page. If any one image item is selected on the first page, the size of the objective 210 to be edited has the size of 1×1. If any one image item is selected on the second page, the size of the objective 210 to be edited has the size of 2×2.

As shown in FIG. 12A (c), a conversion icon 321 for converting one page into another page is included on the editing screen 300. In a case where two pages respectively corresponding to different size information exist, the conversion icon 321 may be used to perform a toggle function. That is, the page displayed on the editing screen 300 may be the first page in the state in which the conversion icon 321 is non-activated, and the page displayed on the editing screen 300 may be the second page in the state in which the conversion icon 321 is activated.

For example, if the conversion icon 321 is selected by the user as shown in FIG. 12A (c), the first page 331 output on the display unit 151 is converted into the second page 332 as shown in FIG. 12A (d).

That is, the controller 180 controls the display unit 151 to output the second page 332 on the editing screen 300 in the activated state of the conversion icon 321, and controls the display unit 151 to output the first page 331 on the editing screen 300 in the non-activated state of the conversion icon 321.

Although not shown in this figure, if the conversion icon 321 is re-selected by the user in the activated state of the conversion icon 321, the conversion icon 321 is non-activated, and the visual exterior appearance of the conversion icon 321 is changed into that before the conversion icon 321 is activated. Further, the conversion icon 321 is non-activated, so that the first page 331 is output on the display unit 151, rather that the second page 332.

Meanwhile, if the conversion icon 321 is selected, the controller 180 changes the visual exterior appearance of the conversion icon 321. That is, the controller 180 changes the visual exterior appearance of the conversion icon 321, so as to provide the user with information on whether the conversion icon 321 is activated or non-activated. In order to change the visual exterior appearance of the conversion icon 321, the controller 180 changes the color, transparency and size of a portion of the conversion icon 321.

If any one image item 332a is selected by the user on the second page 332 as shown in FIG. 12A (d), the controller 180, as shown in FIG. 12B, changes the exterior appearance of the objective 210 to be edited (see FIGS. 12A (a) and (b)) to have an image corresponding to the selected image item 332a and size information corresponding to the second page 332, and output the objective 210 on the home screen 200.

Although not shown in this figure, the controller 180, as described in FIG. 5C, may control the display unit 151 to output the preview screen so that the user can previously see an objective to be changed into the selected image and the size corresponding to the selected image.

If a touch input for executing the edition mode is applied to the objective 210 of which size is changed into, for example, the size of 2×2 through the method for changing the size of the objective, described together in FIGS. 12A and 12B, as shown in FIG. 12C (a), the controller 180, as shown in FIG. 12C (b), executes the editing mode on the objective 210 (here, the touch input method for executing the edition mode on the objective 210 is the same as that described together in FIGS. 12A and 12B, and therefore, its detailed description will be omitted).

When the editing screen 300 is output on the display unit 151, the controller 180, as shown in FIG. 12C (c), first outputs, on the display unit 151, a page having information on the same size as that of the objective 210 to be edited output on the current home screen 200 among the plurality of pages respectively matched to different size information, based on that the edition mode is executed.

Thus, in a case where the editing screen 300 is output as shown in FIG. 12C (c), the controller 180 first displays the second page 332 including images having, for example, the size of 2×2, rather that the first page 331. Similarly, in a case where the editing screen 300 is output as shown in FIG. 12C (c), it can be seen that the page including images corresponding to the size of 1×1 that is the size of the objective 210 to be edited (see FIG. 12A (a)) is output on the display unit 151.

Meanwhile, if the second page 332 is displayed on the display unit 151, the controller 180 controls the display unit 151 so that the conversion icon 321 has the visual exterior appearance corresponding to the activated state.

In a case where the page 331 matched to a size different from that of the currently output page 332 is output as described in FIGS. 12A (c) and (d), the user, as shown in 12C (c) and (d), can convert the page, using the conversion icon 321 for converting one page into another page.

If the conversion icon 321 is re-selected by the user, the conversion icon 321 is non-activated, and the visual exterior appearance of the conversion icon 321 is changed into that before the conversion icon 321 is activated. Further, the first page 331 is output on the display unit 151, rather than the second page 332.

As described above, in the mobile terminal according to the exemplary embodiment, when the user desires to change the size of an objective output on a home screen, the user selects any one image item on a page including an image item corresponding to information on a size different from that of the objective output on the current home screen, thereby changing at least one of the image and size of the objective.

Hereinafter, a method for placing an objective to be edited, in consideration of other objectives placed near the objective to be edited, will be described in detail with reference to the accompanying drawings. FIGS. 13A to 13F are conceptual views illustrating a method for placing an objective as the size of the objective is changed in the mobile terminal according to an exemplary embodiment.

In the mobile terminal according to the exemplary embodiment, when the size of an objective to be edited included on the home screen 200, the controller 180 may determine a range in which the size of the objective to be edited is changeable, in consideration of the placement relationship between the objective to be edited and at least one objective placed near the objective to be edited.

Figure 13A:
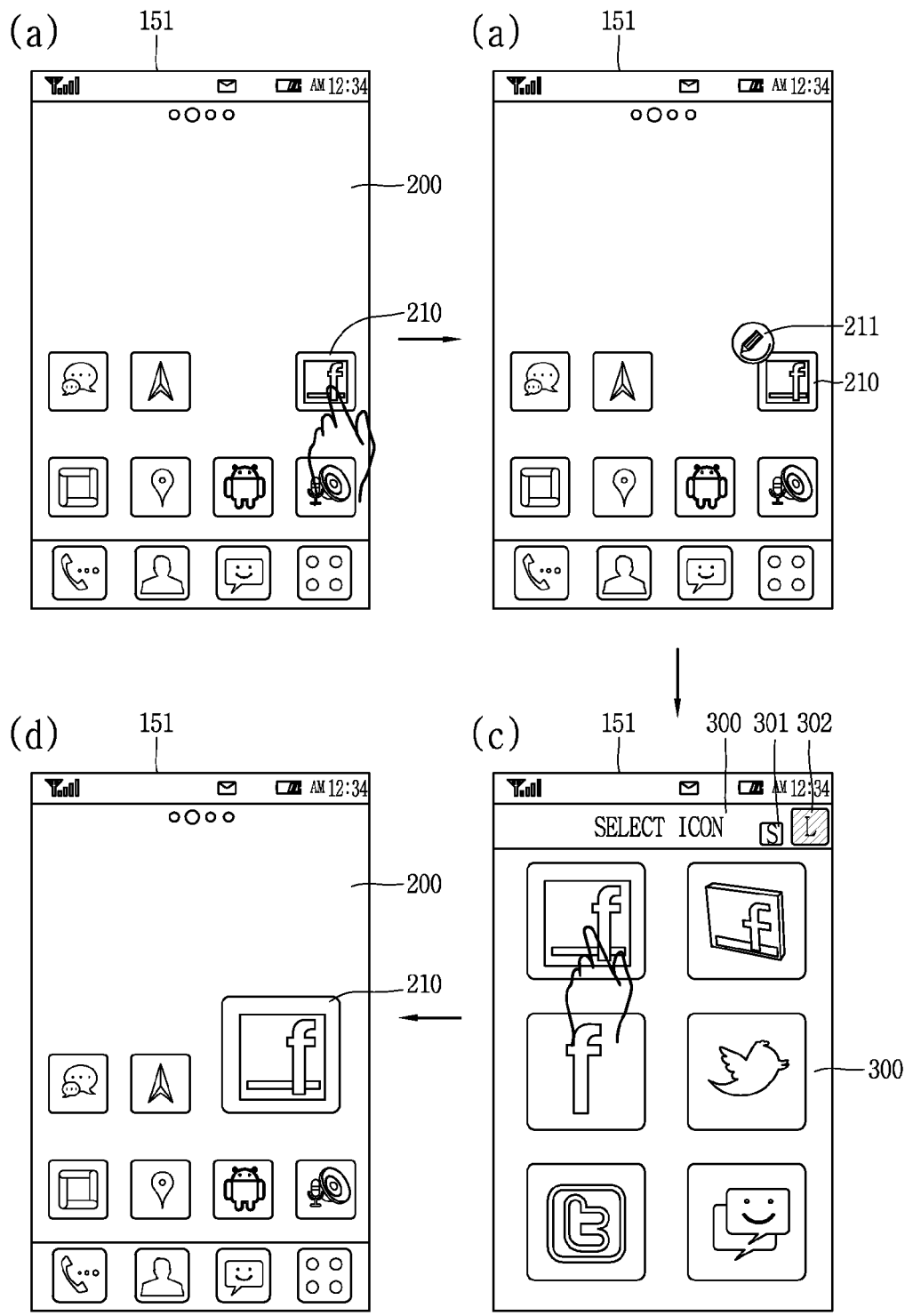
FIGS. 13A to 13F are conceptual views illustrating a method for placing an objective as the size of the objective is changed in the mobile terminal according to an exemplary embodiment.

As an example, in a case where the edition mode for an objective 210 (hereinafter, referred to as an 'objective to be edited') related to the 'Facebook' application is executed, and the changing of the size of the objective 210, which has been displayed to have the size of 1×1, into the size of 2×2 is selected on the editing screen as shown in FIGS. 13A (a), (b) and (c), the controller 180, as shown in FIG. 13A (d), changes the size of the objective 210 to be edited into the size of 2×2.

In a case where the enlarging or reducing of the size of the objective 210 to be edited is selected, the controller 180 may determine a region on which the objective 210 to be edited is to be displayed, based on a predetermined reference.

Figure 13B:
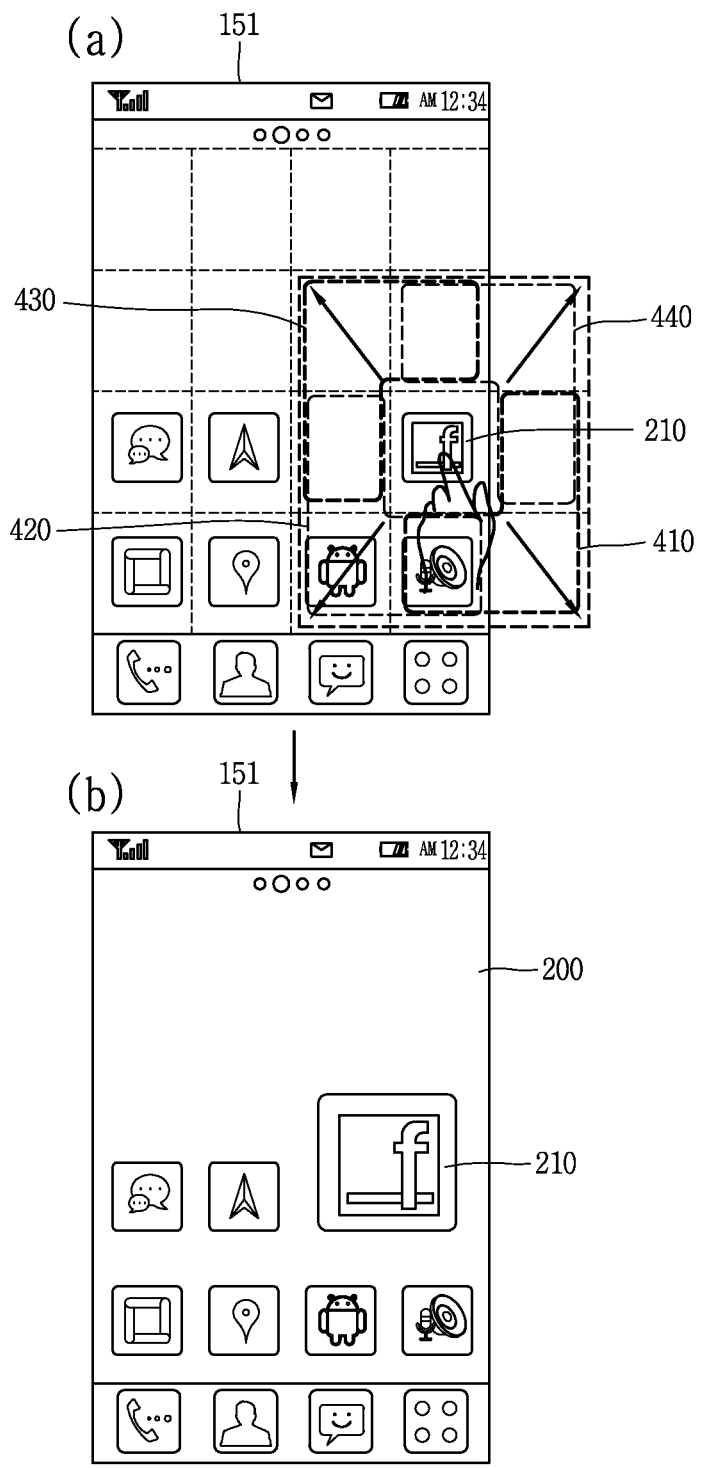

For example, in a case where the changing of the size of the objective 210 to be edited from the size of 1×1 into the size of 2×2, the controller 180, as shown in FIG. 13B (a), may divide the peripheral region of the objective 210 to be edited into first to fourth reference regions 410, 420, 430 and 440. The controller 180 may display the objective 210 to be edited so as to be enlarged on any one empty region of the first to fourth reference regions 410, 420, 430 and 440.

Here, the controller 180 may determine a reference direction in advance, and determine an order for deciding the empty region of the first to fourth reference regions 410, 420, 430 and 440.

For example, in a case where the 'five-hour clockwise direction' is the reference direction, the controller 180 decides whether to display the objective 210 enlarged on the first region 410. In a case where the enlarged objective 210 is not placed on the first region 410, the controller decides whether to display the enlarged objective 210 on the second region 420.

The empty region of the first to fourth reference regions 410, 420, 430 and 440 is decided in such an order. In a case where the third region 430 is empty, the controller 180, as shown in FIG. 13B (b), may display the objective 210 to be edited so as to be enlarged on the third region 430.

Figure 13C:
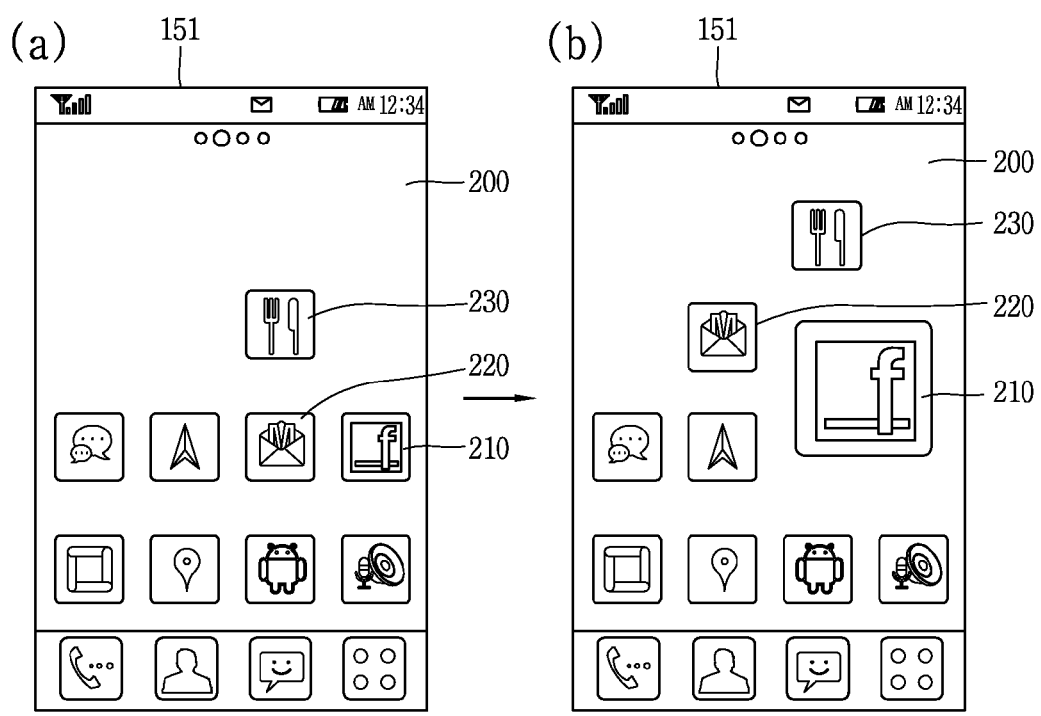

For example, in a case where the objective 210 to be edited, corresponding to the 'Facebook' application, is an objective to be enlarged with the size of 2×2 as shown in FIG. 13C (a), the controller 180, as described in FIG. 13B, first decides whether there exists a region in which the objective 210 to be edited can be enlarged and displayed. In a case where the region in which the objective 210 to be edited can be enlarged and displayed does not exist as the decided result, the controller 180 changes the position of at least one objective 220 and 230 placed near the objective 210 to be edited, thereby securing the region in which the objective 210 to be edited can be displayed.

Figure 13D:
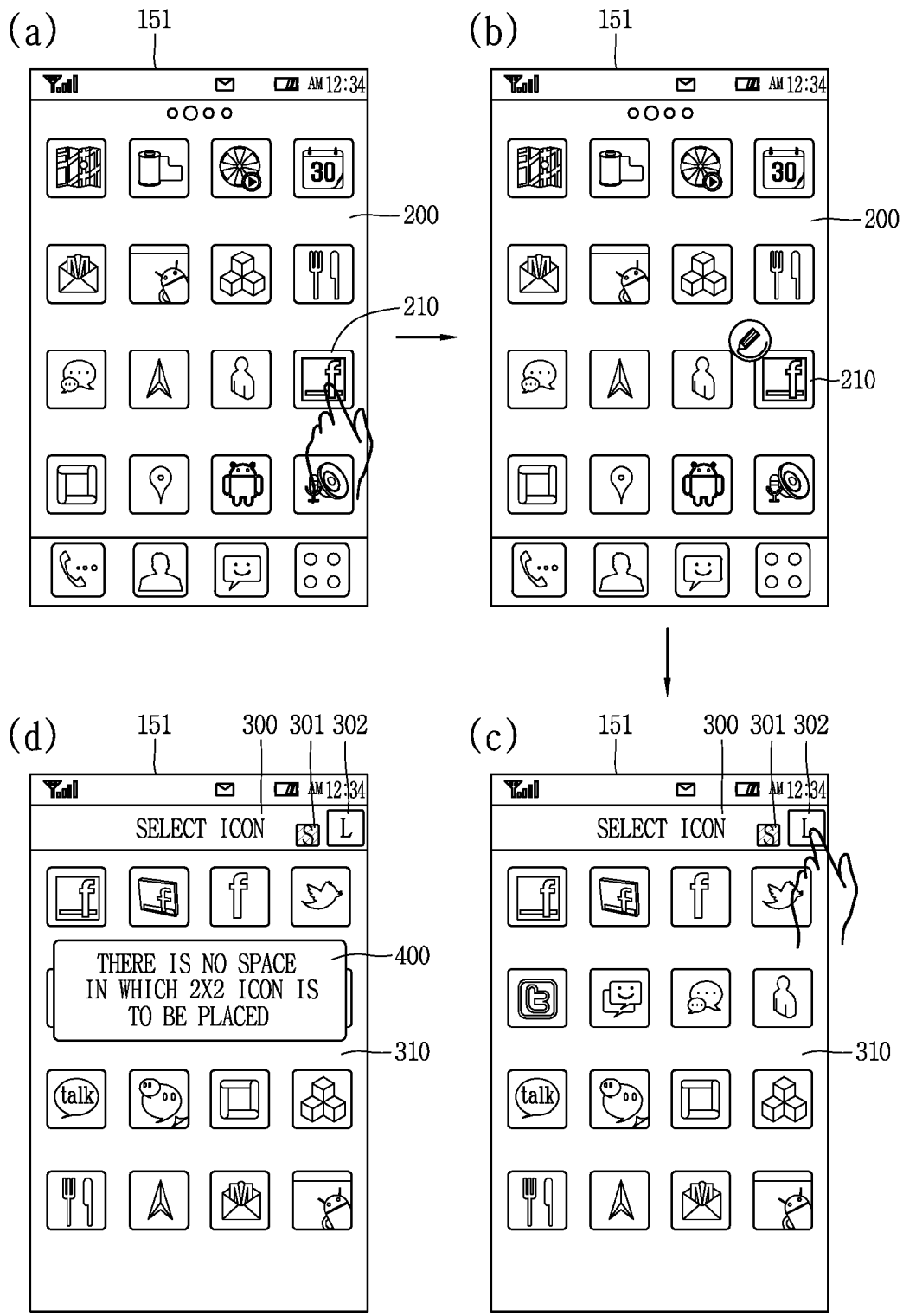
Figure 13E:
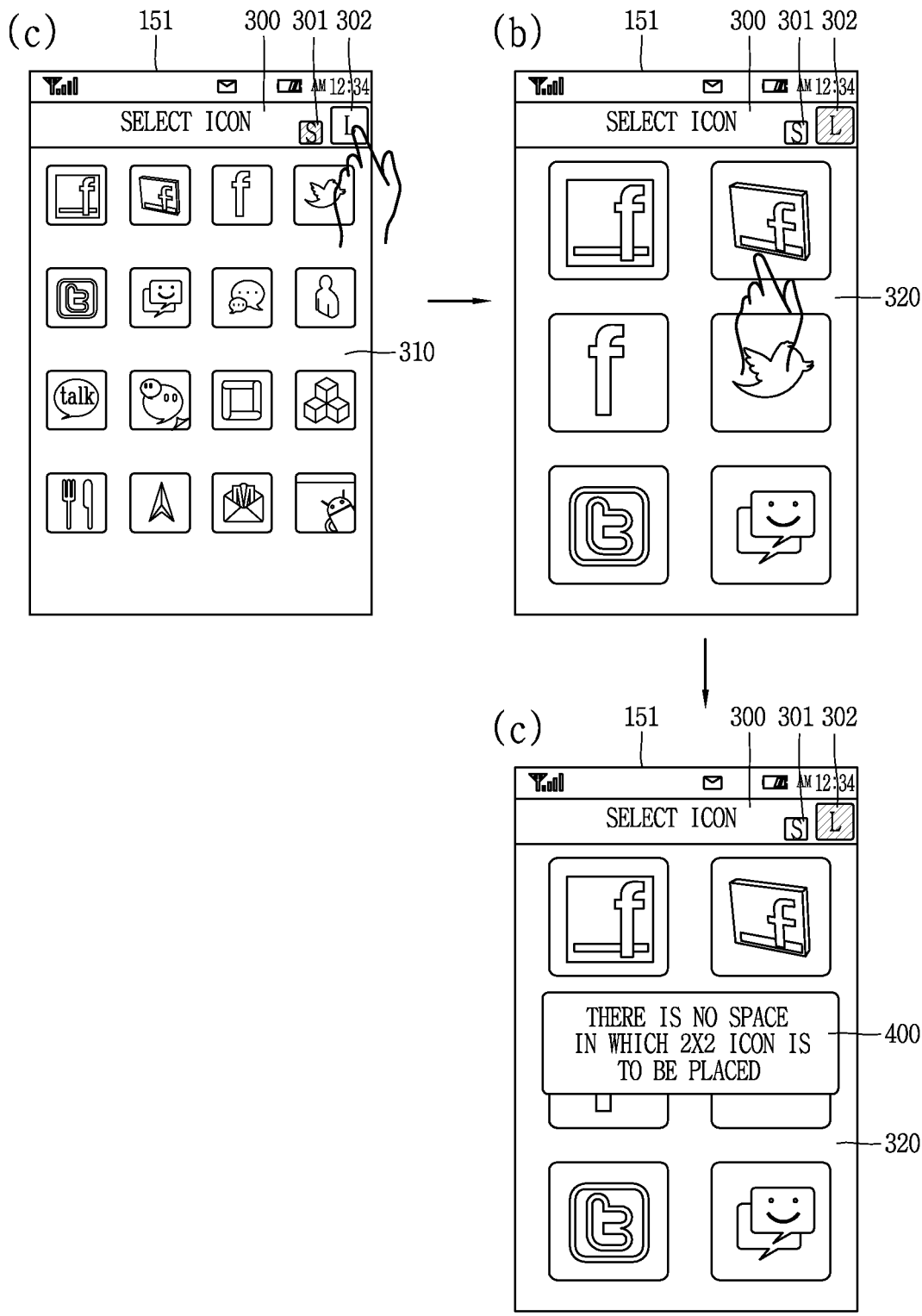

As another example, in a case where the size of the objective 210 to be edited cannot be enlarged by changing the positions of objectives placed near the objective 210 to be edited, due to the completion of the placement of all objectives on the home screen 200, as shown in FIG. 13D (a) and (b), the controller 180, as shown in FIG. 13D (c) and (d) and FIG. 13E (c), may output a popup window 400 and notify the user that the objective 210 to be edited cannot be enlarged.

In this case, the controller 180, as shown in FIG. 13D (c), may output a popup window 310 on the display unit 151, based on that a conversion icon 302 is selected so as to convert the page into a page on which images corresponding to the size of 2×2 are placed.

As shown in FIGS. 13E (b) and (c), the controller 180 may output a popup window 320 on the display unit 151, based on that an image corresponding to the size of 2×2 is selected. The notification information for notifying the user that the changing of the size of the objective 210 to be edited is impossible may be output through voice or vibration, as well as the popup window 400.

Figure 13F:
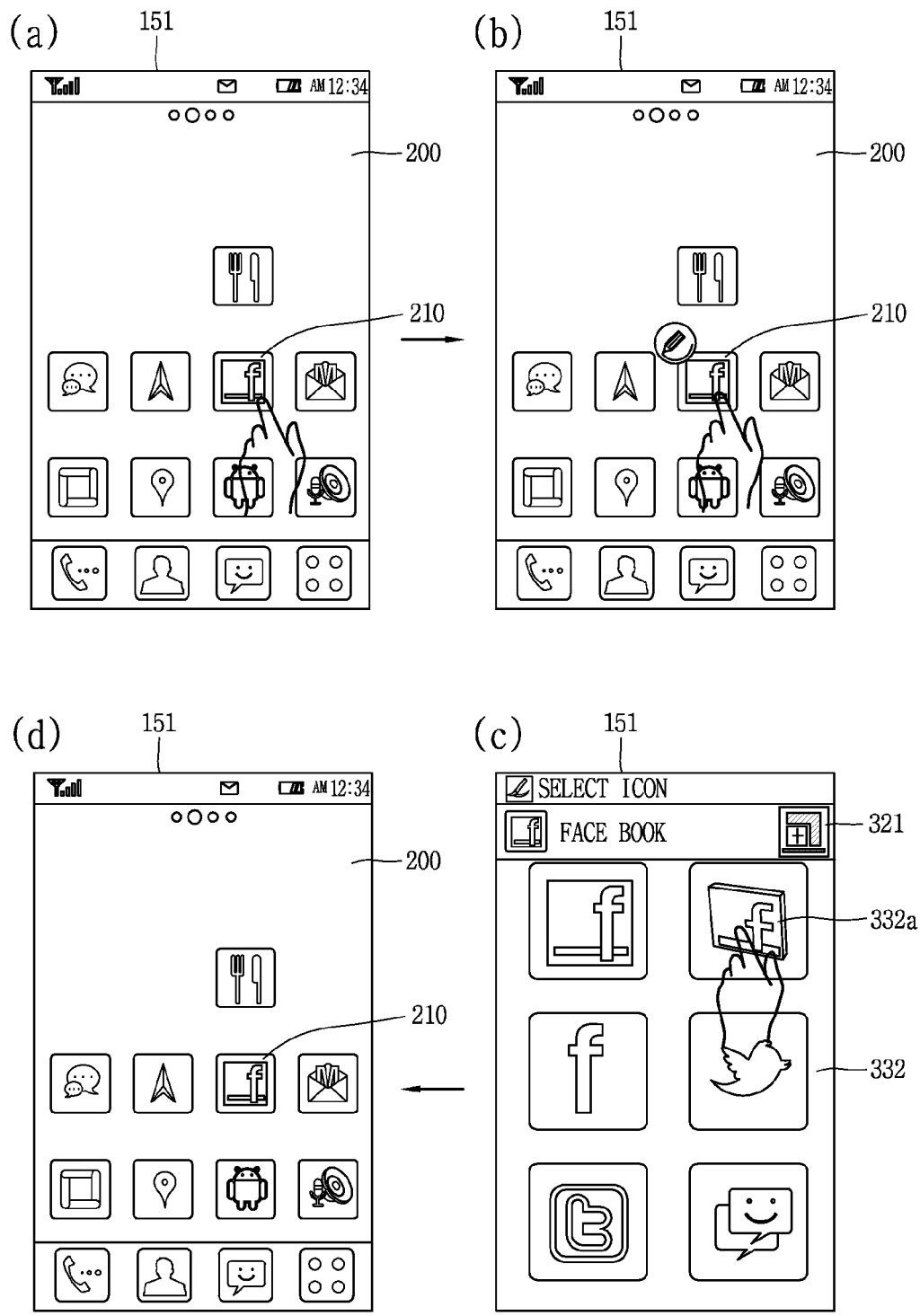

As still another example, a case where other objectives are previously placed near the objective 210 to be edited on the home screen 200, and therefore, the size of the objective 210 to be edited cannot be changed as shown in FIG. 13F (a) will be described. In a case where the size corresponding to an image item 332a selected through the editing screen 300 is larger than the size of the objective 210 to be edited as shown in FIGS. 13F (b) and (c), the controller 180, as shown in FIG. 13F (d), does not change the size and image of the objective 210 to be edited but originally outputs the objective 210 to be edited on the home screen 200. That is, in a case where an image item is selected on the page 332 corresponding to size information on which the objective 210 to be edited cannot be placed on the home screen through the editing screen 300, the controller 180 may not change the image of the objective 210 to be edited as well as the size of the objective 210 to be edited, in consideration of the placement relationship between the objective 210 to be edited and the other objectives on the current home screen 200.

Although not shown in this figure, the controller 180 does not change the objective 210 to be edited but may change the image of the objective 210 to be edited into an image corresponding to the image item 332a selected through the editing screen 300.

As described above, in the mobile terminal according to the exemplary embodiment, the size of the objective can be changed, based on a series of references.

In the mobile terminal and the control method therefor according to the exemplary embodiments, the display of an icon or widget can be changed, using a touch input to the icon or widget output on the display unit. Thus, the user can enlarge the size of an icon or widget of an application frequently used, thereby improving the convenience of entry into the frequently used application.

Meanwhile, the method for enlarging the size of objectives has been mainly described as an example in the specific embodiments described above. However, the specific embodiments can be identically applied to the method for reducing the size of objectives.

According to an exemplary embodiment, the aforementioned method can be embodied as computer readable codes on a computer-readable recording medium. Examples of the computer readable recording medium include a ROM, RAM, CD-ROM, magnetic tapes, floppy disks, optical data storage devices, and carrier waves (such as data transmission through the Internet).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a touchscreen; and
    a controller configured to:
        cause the touchscreen to display a plurality of widgets, wherein each widget of the plurality of widgets is associated with an application executable at the mobile terminal;
        cause the touchscreen to display a first indicator in response to user input received with regard to a first widget of the plurality of widgets when a size increase of the first widget is not limited according to displayed locations of other widgets of the plurality of widgets, wherein the first indicator encompasses all of the first widget and represents a size that the first widget is able to be changed to;
        cause the touchscreen to display the first widget according to the changed size as represented by the first indicator; and
        cause the touchscreen to display a second indicator different from the first indicator in response to user input received with regard to the first widget of the plurality of widgets when the size increase of the first widget is limited according to displayed locations of other widgets of the plurality of widgets, wherein the second indicator indicates that a size of the second widget is not able to be changed, wherein the first indicator and the second indicator are not displayed at the same time.

2. The mobile terminal of claim 1, wherein the first indicator is rectangular.

3. The mobile terminal of claim 1, wherein the first indicator is any of a plurality of different sizes to indicate that the size of the first widget is able to be changed to a corresponding plurality of different sizes.

4. The mobile terminal of claim 1, wherein the second indicator is a pop up window.

5. The mobile terminal of claim 1, wherein the controller is further configured to:
    change the size of the first widget according to length of a drag input.

6. The mobile terminal of claim 1, wherein the controller is further configured to:
    cause the touchscreen to display an editing screen for changing the size of the first widget.

7. A display method for a mobile terminal having a touchscreen, the method comprising:
    displaying a plurality of widgets on the touchscreen, wherein each widget of the plurality of widgets is associated with an application executable at the mobile terminal;
    displaying a first indicator on the touchscreen in response to user input received with regard to a first widget of the plurality of widgets when a size increase of the first widget is not limited according to displayed locations of other widgets of the plurality of widgets, wherein the first indicator encompasses all of the first widget and represents a size that the first widget is able to be changed to;
    displaying the first widget on the touchscreen according to the changed size as represented by the first indicator; and
    displaying a second indicator different from the first indicator on the touchscreen in response to user input received with regard to the first widget of the plurality of widgets when the size increase of the first widget is limited according to displayed locations of other widgets of the plurality of widgets, wherein the second indicator indicates that a size of the second widget is not able to be changed, wherein the first indicator and the second indicator are not displayed at the same time.

8. The method of claim 7, wherein the first indicator is rectangular.

9. The method of claim 7, wherein the first indicator is any of a plurality of different sizes to indicate that the size of the first widget is able to be changed to a corresponding plurality of different sizes.

10. The method of claim 7, wherein the second indicator is a pop up window.

11. The method of claim 7, further comprising:
    changing the size of the first widget according to length of a drag input.

12. The method of claim 7, further comprising:
    displaying an editing screen for the changing the size of the first widget.

* * * * *